(12) United States Patent
Fürsich

(10) Patent No.: US 10,247,941 B2
(45) Date of Patent: Apr. 2, 2019

(54) VEHICLE VISION SYSTEM WITH LIGHT FIELD MONITOR

(71) Applicant: MAGNA ELECTRONICS INC., Auburn Hills, MI (US)

(72) Inventor: Manfred Fürsich, Oberhaching (DE)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 361 days.

(21) Appl. No.: 14/997,830

(22) Filed: Jan. 18, 2016

(65) Prior Publication Data

US 2016/0209647 A1    Jul. 21, 2016

Related U.S. Application Data

(60) Provisional application No. 62/260,758, filed on Nov. 30, 2015, provisional application No. 62/257,443, filed on Nov. 19, 2015, provisional application No. 62/173,435, filed on Jun. 10, 2015, provisional application No. 62/153,664, filed on Apr. 28, 2015, provisional application No. 62/129,284, filed on Mar. 6, 2015, provisional application No. 62/113,556, filed on Feb. 9, 2015, provisional application No. 62/104,944, filed on Jan. 19, 2015.

(51) Int. Cl.
*G02B 27/01*   (2006.01)
*G02B 27/00*   (2006.01)

(52) U.S. Cl.
CPC ..... *G02B 27/0093* (2013.01); *G02B 27/0075* (2013.01); *G02B 27/0101* (2013.01); *G02B 2027/014* (2013.01); *G02B 2027/0127* (2013.01); *G02B 2027/0138* (2013.01); *G02B 2027/0187* (2013.01)

(58) Field of Classification Search
CPC .......................... G02B 27/00; G02B 27/0093; G02B 27/0101; G02B 2027/0138; G02B 27/0187; G02B 2027/014; G02B 2027/0127; G09G 3/001; G09G 3/002; G09G 3/003
See application file for complete search history.

(56) References Cited

U.S. PATENT DOCUMENTS

| | | |
|---|---|---|
| 4,546,551 A | 10/1985 | Franks |
| 4,953,305 A | 9/1990 | Van Lente et al. |
| 5,530,240 A | 6/1996 | Larson et al. |
| 5,550,677 A | 8/1996 | Schofield et al. |
| 5,576,687 A | 11/1996 | Blank et al. |
| 5,632,092 A | 5/1997 | Blank et al. |
| 5,668,663 A | 9/1997 | Varaprasad et al. |
| 5,670,935 A | 9/1997 | Schofield et al. |

(Continued)

*Primary Examiner* — Antonio Xavier
(74) *Attorney, Agent, or Firm* — Honigman LLP

(57) ABSTRACT

A vision system of a vehicle includes a display configured to be disposed in the vehicle so as to be operable to display images for viewing by an occupant of the vehicle. The display includes a light field display. The system may include at least one camera configured to be disposed at a vehicle so as to have a respective field of view exterior of the vehicle, whereby the display may display images derived from image data captured by the at least one camera. The vision system may include a head-up display system having the light field display disposed at or in the instrumental panel and projecting images onto a combiner on top of the dashboard facing the driver of the vehicle.

16 Claims, 49 Drawing Sheets

(56) References Cited

U.S. PATENT DOCUMENTS

| | | |
|---|---|---|
| 5,699,044 A | 12/1997 | Van Lente et al. |
| 5,708,410 A | 1/1998 | Blank et al. |
| 5,724,187 A | 3/1998 | Varaprasad et al. |
| 5,737,226 A | 4/1998 | Olson et al. |
| 5,802,727 A | 9/1998 | Blank et al. |
| 5,878,370 A | 3/1999 | Olson |
| 5,910,854 A | 6/1999 | Varaprasad et al. |
| 5,949,331 A | 9/1999 | Schofield et al. |
| 6,087,953 A | 7/2000 | DeLine et al. |
| 6,120,461 A | 9/2000 | Smyth |
| 6,173,501 B1 | 1/2001 | Blank et al. |
| 6,222,460 B1 | 4/2001 | DeLine et al. |
| 6,329,925 B1 | 12/2001 | Skiver et al. |
| 6,420,036 B1 | 7/2002 | Varaprasad et al. |
| 6,498,620 B2 | 12/2002 | Schofield et al. |
| 6,513,252 B1 | 2/2003 | Schierbeek et al. |
| 6,642,851 B2 | 11/2003 | DeLine et al. |
| 6,690,268 B2 | 2/2004 | Schofield et al. |
| 6,822,713 B1 | 11/2004 | Yaroshchuk et al. |
| 7,004,593 B2 | 2/2006 | Weller et al. |
| 7,038,577 B2 | 5/2006 | Pawlicki et al. |
| 7,184,190 B2 | 2/2007 | McCabe et al. |
| 7,195,381 B2 | 3/2007 | Lynam et al. |
| 7,245,273 B2 | 7/2007 | Eberl |
| 7,249,860 B2 | 7/2007 | Kulas et al. |
| 7,253,723 B2 | 8/2007 | Lindahl et al. |
| 7,255,451 B2 | 8/2007 | McCabe et al. |
| 7,274,501 B2 | 9/2007 | McCabe et al. |
| 7,289,037 B2 | 10/2007 | Uken et al. |
| 7,308,341 B2 | 12/2007 | Schofield et al. |
| 7,329,013 B2 | 2/2008 | Blank et al. |
| 7,338,177 B2 | 3/2008 | Lynam |
| 7,370,983 B2 * | 5/2008 | DeWind .......... B60K 35/00 359/844 |
| 7,423,522 B2 | 9/2008 | O'Brien et al. |
| 7,446,650 B2 | 11/2008 | Schofield et al. |
| 7,581,859 B2 | 9/2009 | Lynam |
| 7,616,781 B2 | 11/2009 | Schofield et al. |
| 7,626,749 B2 | 12/2009 | Baur et al. |
| 7,720,580 B2 | 5/2010 | Higgins-Luthman |
| 7,722,199 B2 | 5/2010 | DeWard et al. |
| 7,855,755 B2 | 12/2010 | Weller et al. |
| 7,937,667 B2 | 5/2011 | Kramer et al. |
| 8,500,284 B2 * | 8/2013 | Rotschild .......... G02B 27/2271 353/10 |
| 9,264,672 B2 | 2/2016 | Lynam |
| 2002/0015007 A1 * | 2/2002 | Perlin .......... G02B 27/2214 345/6 |
| 2002/0084951 A1 * | 7/2002 | McCoy .......... G09G 3/003 345/31 |
| 2003/0107785 A1 * | 6/2003 | Takeyama .......... G02B 5/32 359/15 |
| 2003/0122930 A1 * | 7/2003 | Schofield .......... B60R 1/00 348/148 |
| 2005/0083565 A1 * | 4/2005 | Yamazaki .......... G02B 26/0841 359/244 |
| 2005/0134805 A1 * | 6/2005 | Conner .......... H04N 9/3188 353/46 |
| 2005/0185276 A1 * | 8/2005 | Tomisawa .......... G02B 27/2214 359/472 |
| 2005/0243290 A1 * | 11/2005 | Gupta .......... G03B 21/20 353/99 |
| 2006/0007407 A1 * | 1/2006 | Matsui .......... G02B 26/008 353/84 |
| 2006/0050018 A1 | 3/2006 | Hutzel et al. |
| 2006/0061008 A1 | 3/2006 | Karner et al. |
| 2007/0126669 A1 * | 6/2007 | Seto .......... G02B 27/0093 345/76 |
| 2008/0088527 A1 * | 4/2008 | Fujimori .......... G02B 27/01 345/7 |
| 2008/0088587 A1 * | 4/2008 | Pryor .......... H04N 9/3129 345/158 |
| 2008/0316606 A1 * | 12/2008 | Inoguchi .......... G02B 27/0172 359/630 |
| 2009/0033808 A1 * | 2/2009 | Maeda .......... G03B 33/06 348/756 |
| 2009/0231687 A1 | 9/2009 | Yamamoto |
| 2009/0243824 A1 * | 10/2009 | Peterson .......... B60R 1/12 340/435 |
| 2009/0289950 A1 * | 11/2009 | Hamano .......... H04N 9/317 345/589 |
| 2010/0097580 A1 * | 4/2010 | Yamamoto .......... G02B 26/101 353/69 |
| 2011/0175925 A1 * | 7/2011 | Kane .......... G01J 1/42 345/589 |
| 2011/0242102 A1 * | 10/2011 | Hess .......... B60K 35/00 345/419 |
| 2012/0062743 A1 | 3/2012 | Lynam et al. |
| 2012/0139817 A1 * | 6/2012 | Freeman .......... G02B 27/0101 345/8 |
| 2012/0154591 A1 | 6/2012 | Baur et al. |
| 2012/0169875 A1 * | 7/2012 | Matsukawa .......... B60R 1/00 348/148 |
| 2012/0182334 A1 * | 7/2012 | Ranieri .......... G02B 27/2214 345/694 |
| 2012/0188245 A1 * | 7/2012 | Hyatt .......... G02B 27/0172 345/428 |
| 2012/0224062 A1 * | 9/2012 | Lacoste .......... G01C 21/365 348/148 |
| 2013/0010117 A1 * | 1/2013 | Miyoshi .......... B60R 1/00 348/148 |
| 2013/0050834 A1 * | 2/2013 | Fujikawa .......... G02B 27/0101 359/630 |
| 2013/0194426 A1 * | 8/2013 | Schofield .......... B60R 1/00 348/148 |
| 2013/0250114 A1 | 9/2013 | Lu |
| 2013/0286053 A1 * | 10/2013 | Fleck .......... G09G 3/3208 345/690 |
| 2013/0300948 A1 * | 11/2013 | Jannard .......... G02B 27/26 348/756 |
| 2014/0022390 A1 | 1/2014 | Blank et al. |
| 2014/0160284 A1 | 6/2014 | Achenbach et al. |
| 2014/0327771 A1 * | 11/2014 | Malachowsky .......... H04N 7/18 348/148 |
| 2014/0333729 A1 | 11/2014 | Pflug |
| 2014/0340510 A1 | 11/2014 | Ihlenburg |
| 2015/0002642 A1 * | 1/2015 | Dressler .......... B60R 1/00 348/51 |
| 2015/0002940 A1 * | 1/2015 | Nister .......... G02B 27/0172 359/630 |
| 2015/0022664 A1 * | 1/2015 | Pflug .......... H04N 7/181 348/148 |
| 2015/0049193 A1 | 2/2015 | Gupta et al. |
| 2015/0077312 A1 * | 3/2015 | Wang .......... G02B 27/017 345/7 |
| 2015/0092042 A1 | 4/2015 | Fürsich et al. |
| 2015/0145839 A1 * | 5/2015 | Hack .......... G09G 3/3208 345/207 |
| 2015/0262424 A1 * | 9/2015 | Tabaka .......... G02B 27/0075 345/633 |
| 2016/0139412 A1 * | 5/2016 | Sawada .......... G02B 27/0172 359/630 |
| 2017/0010473 A1 * | 1/2017 | Ide .......... G02B 3/0056 |
| 2017/0293148 A1 * | 10/2017 | Park .......... B60K 37/00 |

* cited by examiner

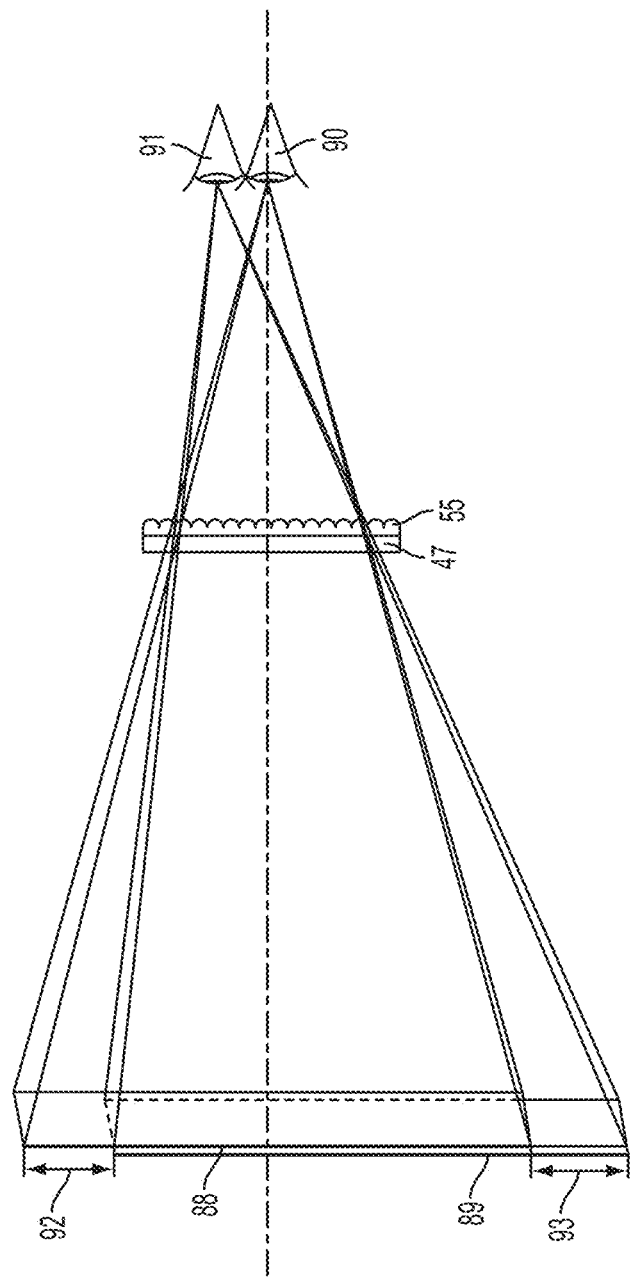

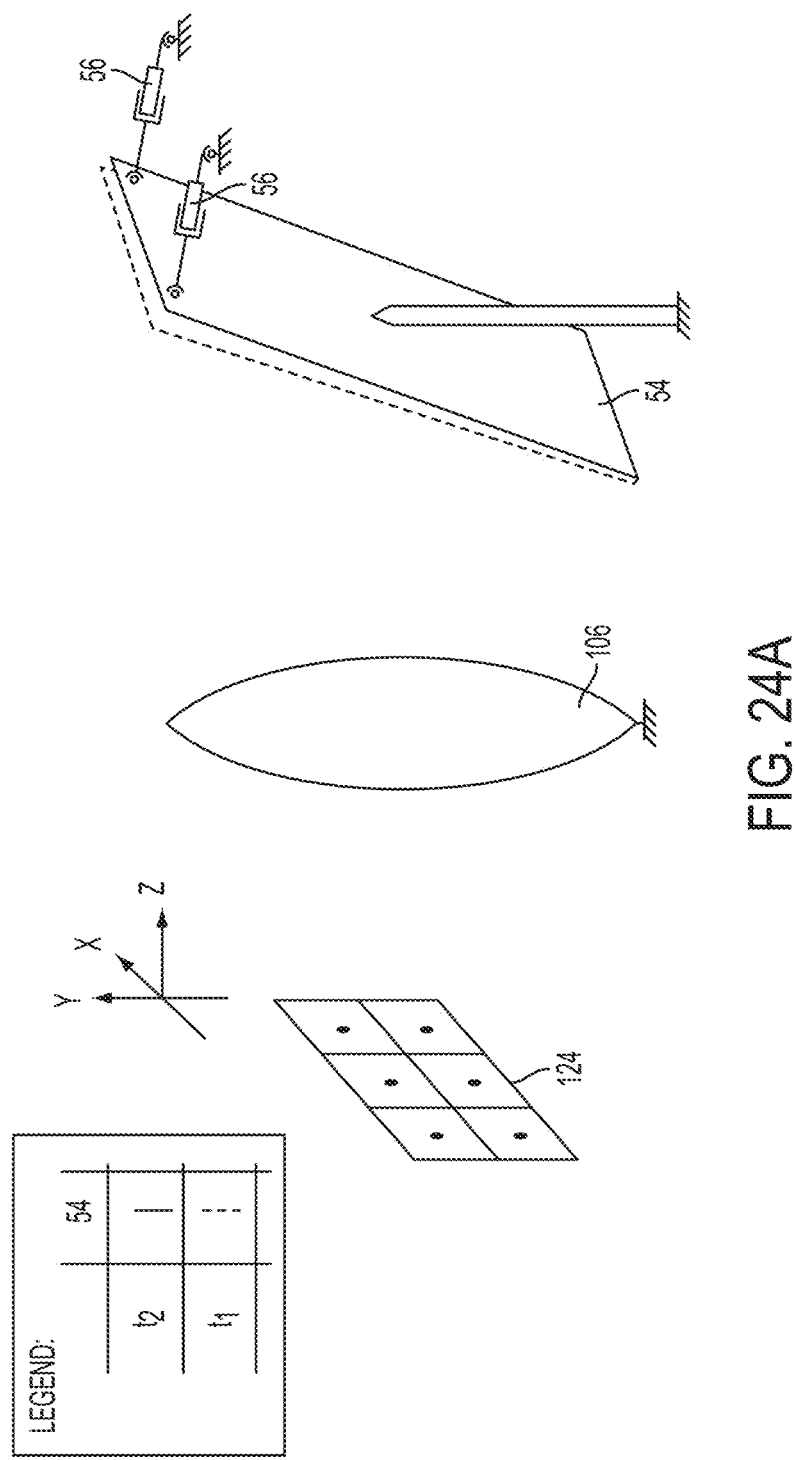

VEHICLE VISION SYSTEM WITH LIGHT FIELD MONITOR

CROSS REFERENCE TO RELATED APPLICATIONS

The present application claims the filing benefits of U.S. provisional applications, Ser. No. 62/260,758, filed Nov. 30, 2015; Ser. No. 62/257,443, filed Nov. 19, 2015, Ser. No. 62/173,435, filed Jun. 10, 2015, Ser. No. 62/153,664, filed Apr. 28, 2015, Ser. No. 62/129,284, filed Mar. 6, 2015, Ser. No. 62/113,556, filed Feb. 9, 2015, and Ser. No. 62/104,944, filed Jan. 19, 2015, which are hereby incorporated herein by reference in their entireties.

FIELD OF THE INVENTION

The present invention relates generally to a vehicle vision system for a vehicle and, more particularly, to a vehicle vision system that includes a display for displaying information to an occupant of a vehicle.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties. A light field projector is described in International Publication No. WO 2013/162977. This light field projector is positioned very near to the eye and separate light field projectors are provided for each eye.

SUMMARY OF THE INVENTION

The present invention provides a vision system or imaging system for a vehicle that includes a light field display for displaying information to an occupant of a vehicle, with the monitor, display or head up display comprising an eyeglass-free monitor. The light field display or monitor may be a component of a camera monitoring system (such as central review mirror replacement or side mirror replacement, surround and top view vision system or rear panorama vision system), or a component of a navigation system or infotainment system, or a component of a compact Head-up Display System and instrument and driving aid augmentation or the like.

A light field display, as described herein, maps each area of a scene (as captured by an imaging sensor) to a respective appropriate ray in physical space, such that an autostereoscopic visual effect is achieved that is similar to viewing the original scene.

These and other objects, advantages, purposes and features of the present invention will become apparent upon review of the following specification in conjunction with the drawings.

BRIEF DESCRIPTION OF THE DRAWINGS

FIG. 14B shows a display similar to FIG. 14A, where the view is generated in a way that the image appears as being virtually fixed and framed by the display's frame, and when an observer shifts his or her eye position from 90 (seeing image 88) to 91, the image 89 comes into view and the portion 92 shifts out of view while the portion 93 of the virtual image at the virtual viewing distance comes into view;

FIG. 24A shows a display of the present invention, such as an LED array, which yields light spots, with the parallel light beams behind the micro lens array being reflected by a turnable mirror 54, and with the mirror's angle being altered by piezo actuators 56;

LEGEND

Figure 1:
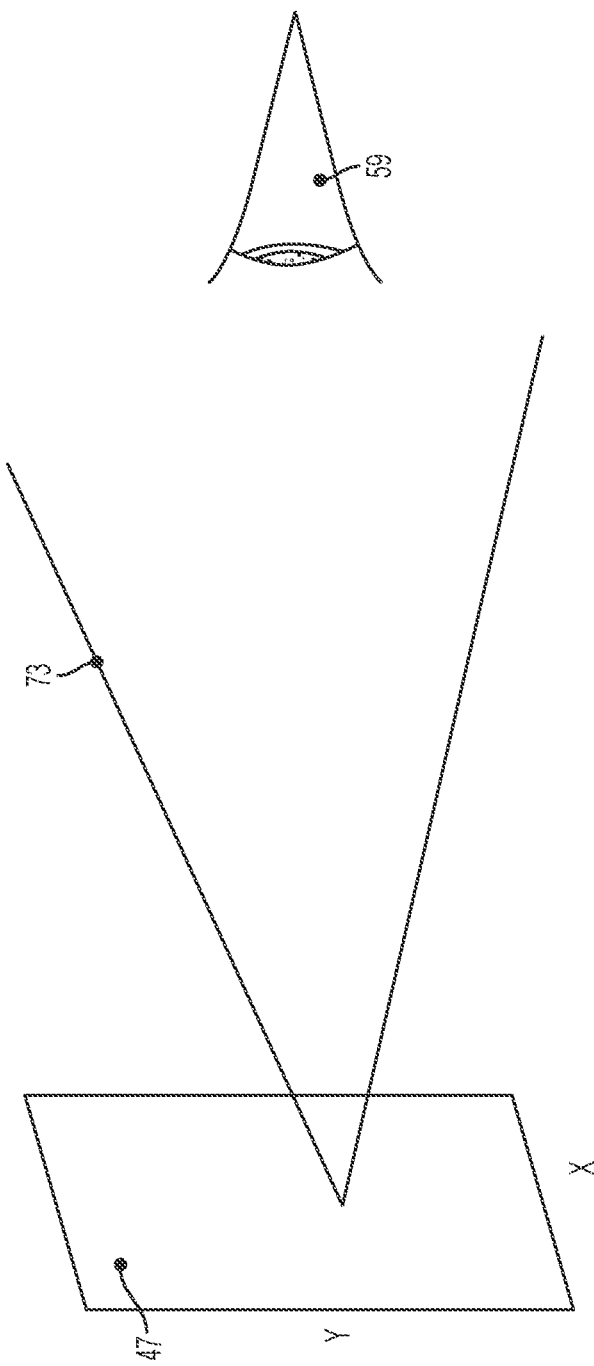
FIG. 1 is a schematic showing a conventional display screen, showing a display 47 and the eye 59 of the observer and the light 73 emitted by the display, with the display providing two dimensional (x and y) information.

1 Rearview camera
4 Light field display
5 Fictive planes
6 Piercing points thru the fictive planes
8 Vehicle inside
20 Blackening foil
41 Left side camera's side-rear image
42 Right side camera's side-rear image
43 Vehicle rear camera's rear image
44 Cluster display
45 Panorama rear view image (generated from 41, 42 and 43)
47 Thin film transistor (TFT) display
48 Light Emitting Diode (LED) display
49 Windshield
50 Non-translucent diffusor
51 Translucent diffusor
52 Mirror
53 Projector unit
54 Turnable mirror in two axes
55 Micro lens array
56 Mirror actuator
57 Combiner (partially translucent mirror element)
59 Viewer's eye/eyes
60 In cabin camera (of head/eye tracking system).
61 Projected (augmented) image light beam
62 Real scene image (from behind combiner)
63 Combined view of real scene 62 with augmentations 61
70 Plane behind the retina
71 Image pattern which creates a blurred image on the retina
72 Image pattern which creates a sharp image on the retina
73 Light rays emitted by TFT display
75 Light rays sharply projected to the retina 77
76 Light rays projected to a plane 70 behind the retina, not seen sharply
77 Retina of the human eye
80 Further object focal plane
81 Object focal plane
82 Light beams from focal plane 80
83 Light beams from focal plane 81
84 Imager of a light field camera
85 Micro lens array
86 Main lens of a light field camera
87 Virtual image plane
88 Virtual image seen from eye position A
89 Virtual image seen from eye position B
90 Viewer's eye on position A
91 Viewer's eye on position B
92 Image content of the top end
93 Image content of the bottom end
94 Fixed virtual image
95 Virtual image pixel
100 Left vehicle door with (frameless) window
101 Side window
102 Light field display furrow
103 Combined light field display Image reflected on side window (overlayed to the real scene from behind the window)
104 Light field display tilted outbound
105 3D structure
106 Single micro lens
107 Field angle of the line from virtual image pixel to eye
108 Line from virtual image pixel to eye
109 Real optical light ray with same direction to the eye as 108
110 Azimuth angle
111 Light field pixel array
112 Found matching pixel
120 Augmented speed limit displaying
121 Augmented current vehicle speed displaying
122 Augmented low fuel level warning displaying
123 Augmented direction indicator displaying
124 Display pixel group below a single micro lens
125 Eye box correlated to the display pixel group 124
126 Center positions of the display pixels referring to image contents A and B
127 Nodes in the eye box which are used for the light field look-up table calculations
128 Eye positions between the calculated nodes
129 Virtual image positions seen from eye positions 128
130 Virtual image positions seen from eye positions 127
131 Display pixels which yield homogeneous light
132 Display pixels with inhomogeneous light emitting area
133 Means to homogenize the seen pixel area
134 Display where the emitted light comes from an area which is much smaller than the pixel pitch for example LEDs
135 Piezo motor which moves the display in x- and y-direction
136 Display where the emitted light comes from an area which is much smaller than the pixel pitch for example LEDs currently not emitting light
137 Display where the emitted light comes from an area which is much smaller than the pixel pitch for example LEDs currently emitting light

DESCRIPTION OF THE PREFERRED EMBODIMENTS

There are different tasks and locations for monitors in a vehicle—monitors typically located at the dashboard, head unit or in the front seat's head rests are often used as infotainment displays, while monitors disposed at the windshield are often used as aftermarket navigation screens. OEM navigation system's monitors are often integrated into the head unit in the lower center, or on top of the dash board in the center. Head up display systems may show navigation system information as well as forward vision driving warning and aiding information. There are some approaches to show forward vision scene augmentation. Vehicle cluster instruments are often done in augmented vision on displays. These displays may show different data individually when required. Vehicle camera vision often uses existing monitors or projectors for displaying camera images and overlays such as rear view camera and top view displaying as well as curb view and cross traffic view. Other applications require extra monitors or displays such as central rear view mirror replacing camera monitor systems or side mirror replacing rear and blind spot camera displays, such as by utilizing aspects of the systems described in International Publication No. WO 2014/204794, which is hereby incorporated herein by reference in its entirety.

One concern with monitors in a vehicle is the presbyopia. Whereas children are able to adapt their eyes from very small distances to infinity, this ability reduces with age. For example, a child may have an accommodation ability of 20 diopters, while a 25 year old young adult may have an accommodation ability of about 10 diopters, and an older person, such as around 60 years old, may have an accommodation ability of about 0.5 to about 1 diopters.

The distance between the monitor and the eyes of the driver depends on the design of the vehicle and the installation of the monitors. However, it also depends on the size of the driver. For example, the distance from the driver's eyes to the monitor may be about 1.2 m for a larger driver, but only about 70 cm for a smaller or petite driver.

Thus, a 60 year old small or petite person will not likely be able see the monitor correctly sharp. Elderly drivers typically have to use bifocal eyeglasses or varifocal eyeglasses to drive a vehicle with a camera monitor system (CMS), which replaces classical mirrors, and to be able to view and discern the displayed images.

The present invention describes a light field display which is positioned at a higher distance (typically 40 cm-90 cm) to the eye and is seen by both eyes simultaneously. This is an improvement over prior art devices (such as International Publication No. WO 2013/162977, which is hereby incorporated herein by reference in its entirety), where the light field projector is positioned very near to the eye and separate light field projectors are provided for each eye.

As described in U.S. Publication No. US-2015-0092042, which is hereby incorporated herein by reference in its entirety, a virtual retinal display is described which creates a virtual image at a virtual distance of 2 meters or more. The described virtual retinal displays or head-up displays need a certain volume. The size of the last optical element (combiner, reflecting mirror) must be considerably larger than a classic monitor in order to get a reasonable eye box size. Also, the depth of the display cannot be reduced or shrunk below a certain value because the needed optical components must be housed. There are many different demands to the design of a dashboard which are hardly to be fulfilled.

To overcome these space wise restrictions, the present invention provides for use of a light field monitor within or at the vehicle cabin. Such a monitor additionally offers a solution for compensating the viewer's individual eye defects such as presbyopia (aging caused farsightedness) and to generate true 3D vision (for both eyes individually).

As shown in FIG. 1, a display 47 may yield two dimensional information x and y. The emitted light 73 is viewable by the human eye 59.

Figure 2:
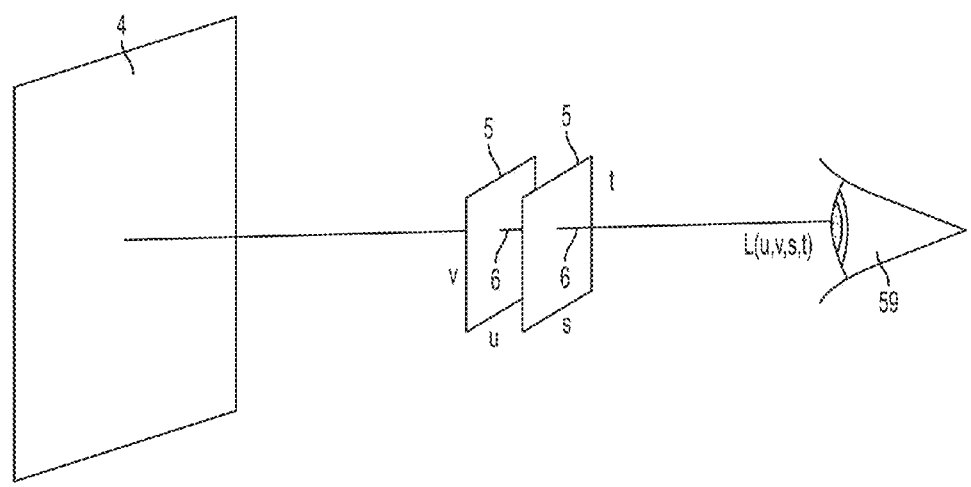
FIG. 2 is a schematic showing the principle of a light field monitor 4, showing two fictive planes 5, through which the light passes with piercing points 6 of the light ray going through the fictive planes, with the human eye 59 viewing the display.

Referring now to the drawings and the illustrative embodiments depicted therein, a schematic showing the principle of a light field monitor 4 is shown in FIG. 2. As shown in FIG. 2, showing two fictive planes 5 through which the light passes with piercing points 6 of the light ray going through the fictive planes, with the human eye 59 viewing the display. A light field display not only varies the light depending on the position at the display area, additionally there is an intensity variation with the ray angles. The light intensity can be described by the function L(u, v, s, t). As this function uses four parameters, such displays are also called 4D displays.

Figure 3A:
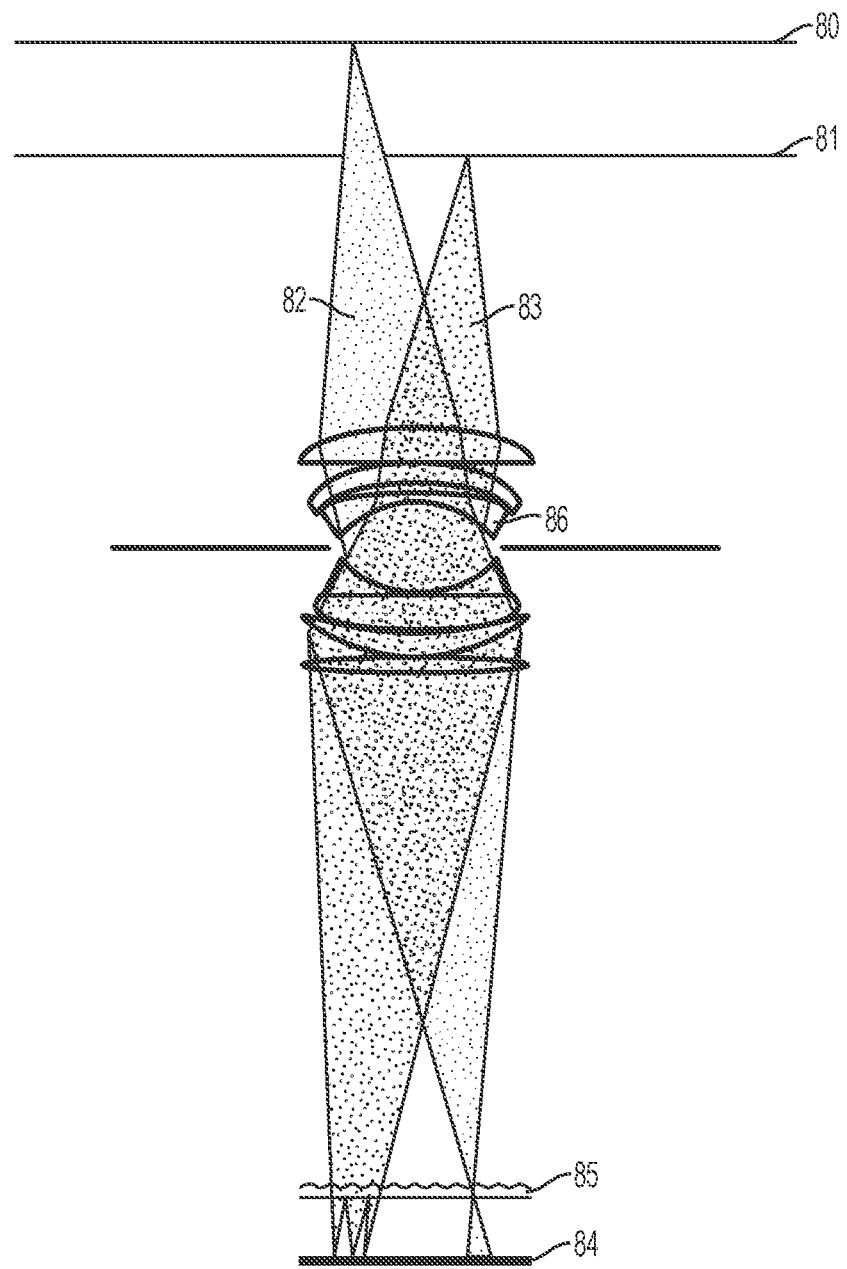
FIGS. 3A and 3B are for comparing the function principle of a light field camera (FIG. 3A) with a light field display (FIG. 3B)
Figure 3B:
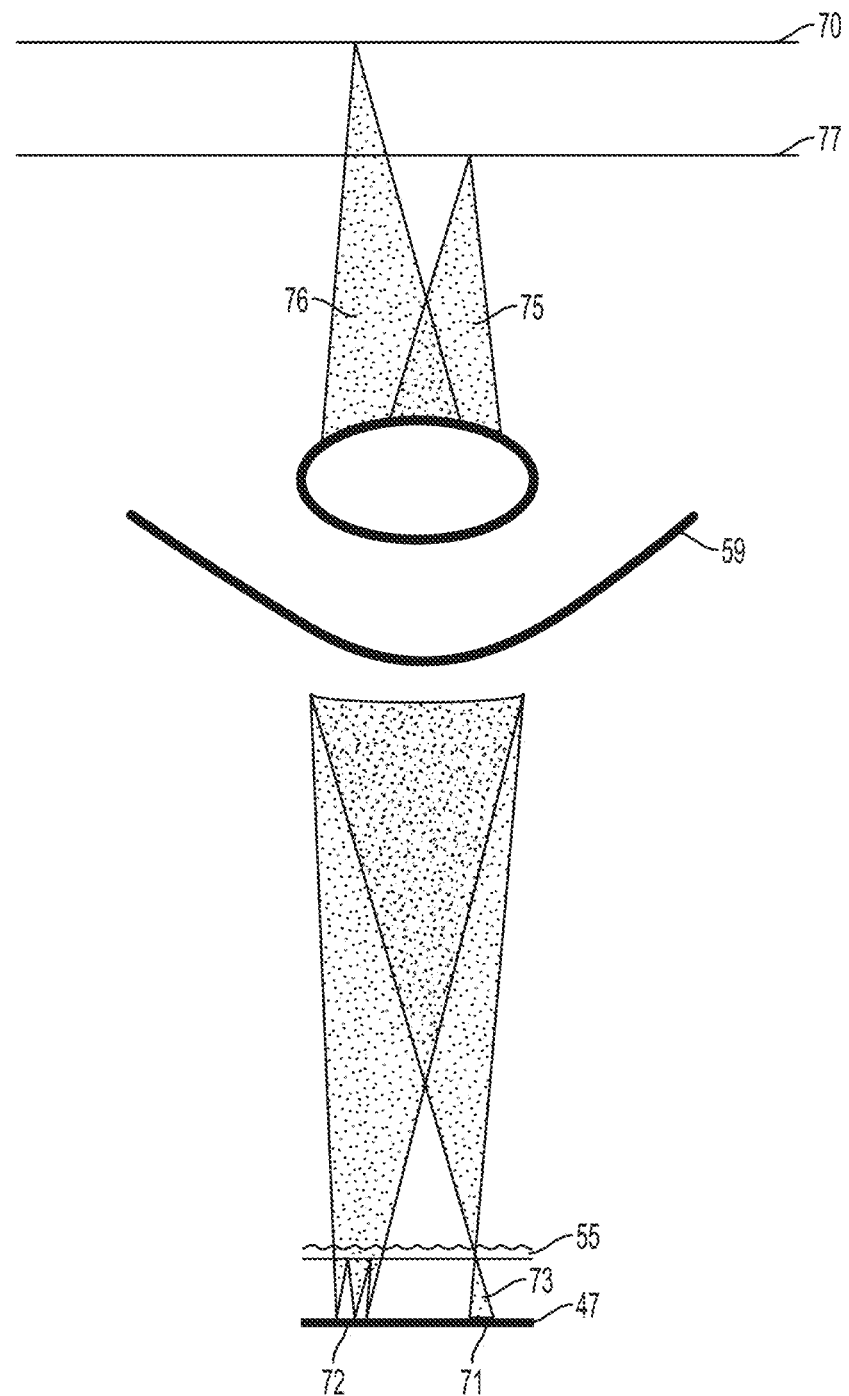

As can be seen with reference to FIGS. 3A and 3B, a comparison is made between the function of a known light field camera (FIG. 3A) and a light field display (FIG. 3B). With respect to the light field camera of FIG. 3A, the object space is at the top, and the light beams 83 coming from the first focal plane 81 are drawn in dark grey and the light beams 82 coming from the second focal plane 80 are drawn in light gray. The main lens 86 projects an image onto the micro lens array 85 and, in a further step, the light rays pass the micro lens array 85. On the photo sensor 84 two different types of image patterns are created for the cases indicated in dark gray 83 and light gray 82. By analyzing these two light patterns it is possible to reconstruct an image so that either the image of the first plane 81 or the image of the second plane 80 becomes sharp.

Figure 3C:
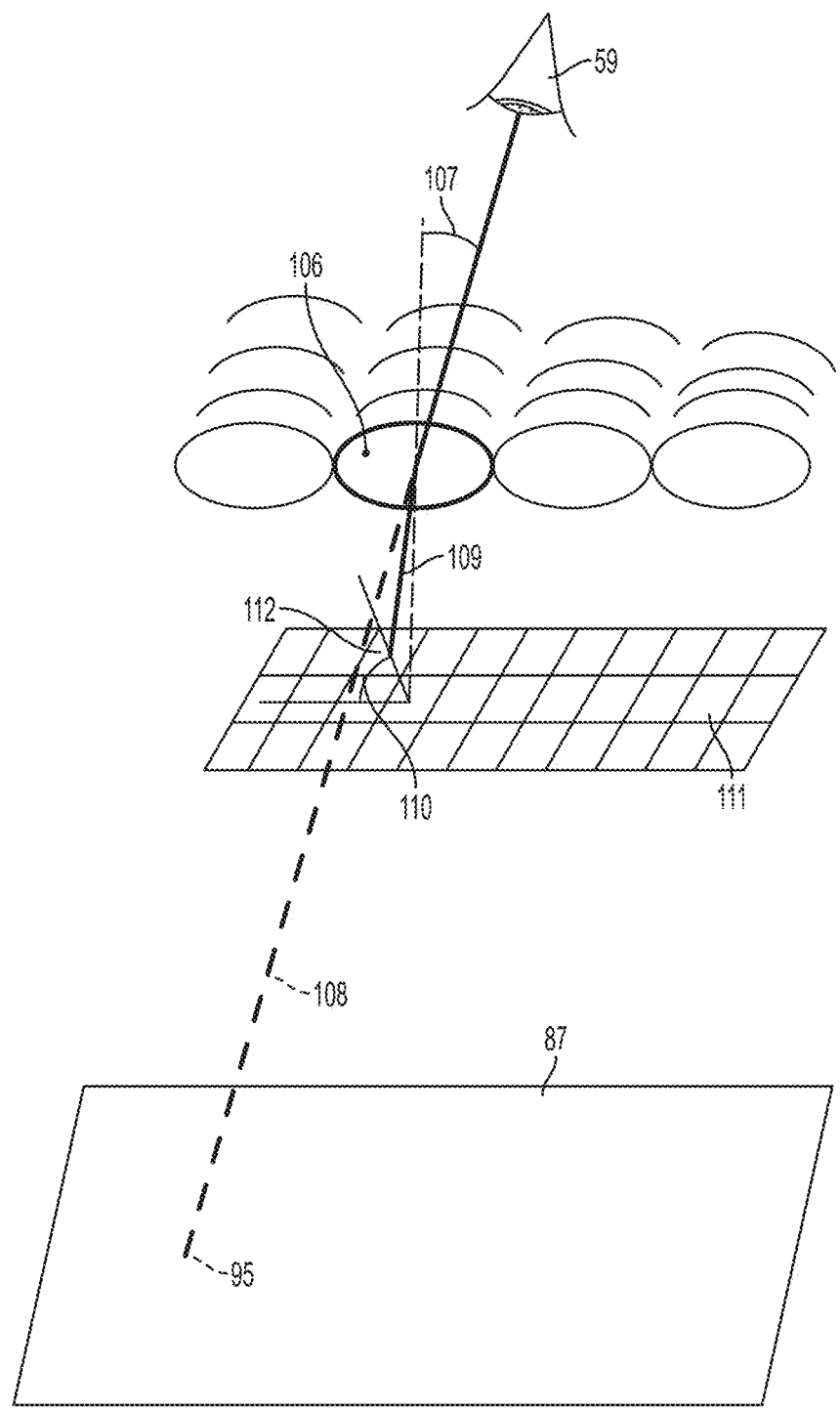
FIG. 3C shows the optical principle how one source image pixel is virtually reproduced by multiple light field display pixels (below a lens array), with the virtual image pixel plane being at a further distance (depth) from the viewer's eye than the real display plane.

With respect to the light field display of FIG. 3B, it can be seen that a light field display works on a similar principle, but the light runs in the opposite direction. The display monitor 47 has pixels. Alternatively to the monitor pixels, there may be pixels coming from a diffusing plate 51 onto which the image with substructure is projected. In FIG. 3B, a (micro) lens array 55 is in the path of light. Two different light beams 75 and 76 are received by a viewer's eye 59. The local image pattern 71 creates the light beams 76, which are projected to a plane 70 behind the retina 77. The image is not seen sharply at the retina. The image pattern 72 creates the light rays 75. These light rays 75 are projected to the human eye's retina sharply. So by writing suitable patterns into the display together with the effect of the micro lenses, it is possible to create dedicated light fields which yield a sharp image on the retina even if the display is not in the focal plane of the eye. Shown in the light field display of FIG. 3C is the optical principle of how to find the connection between a source image pixel and the light field pixel. The dashed line 108 is a vector coming from a virtual image pixel and going to the eye 59. The field angle 107 and the azimuth angle 110 are used together with the optical properties of the micro lens 106 to calculate the real light ray 109 and to find the matching light field pixel 112.

The general view generation may be achieved by the following: the driver looks at the light field display 47+55 from the eye position 90 (see, for example, FIGS. 14A-D) at a typical viewing distance (such as, for example, at about 60 cm). In order to generate a virtual image out of source image information at a virtual distance of, for example, about 2 m from the viewer's eye in the desired size (scaling ratio), a backward ray tracing method may find use. An assumed line may be drawn from each virtual image pixel to the eye position 90, this line crosses a specific micro lens. By analyzing the optics of this specific micro lens, that special pixel below this micro lens can be found which yields the same light beam as the drawn line, as shown in FIG. 3C. So the image pixel value of the source image can be assigned to that specific light field display pixel. The correlation between the source pixels and the light field display pixels can be found in that way.

As a next step, a different eye position 91 is assumed. Again, by assuming lines drawn from the virtual source image to the eye across a specific micro lens, matching pixels under an according micro lens can be found and correlated to the source pixel. The procedure may be repeated with further eye positions.

As a result of this general light field display view generation, the image is seen by the driver sharply even without eye-glasses.

In the following two algorithms of how the virtually viewed content may be generated in specific may be proposed as part of the invention. The view is generated in a way that the image 94 appears as being virtually fixed (in a virtual distance) and framed by the display's frame. Different image portions 88 and 89 may be seen from different eye positions (see FIGS. 14A-D).

When an observer shifts his or her eye position from 90 (seeing image 88) to 91, the image 89 comes into view. The portion 92 virtually moves out of view while the portion 93 of the virtual image at the virtual viewing distance comes into view.

Optionally, the virtual object planes are turned orthogonal to the observer.

Figure 14A:
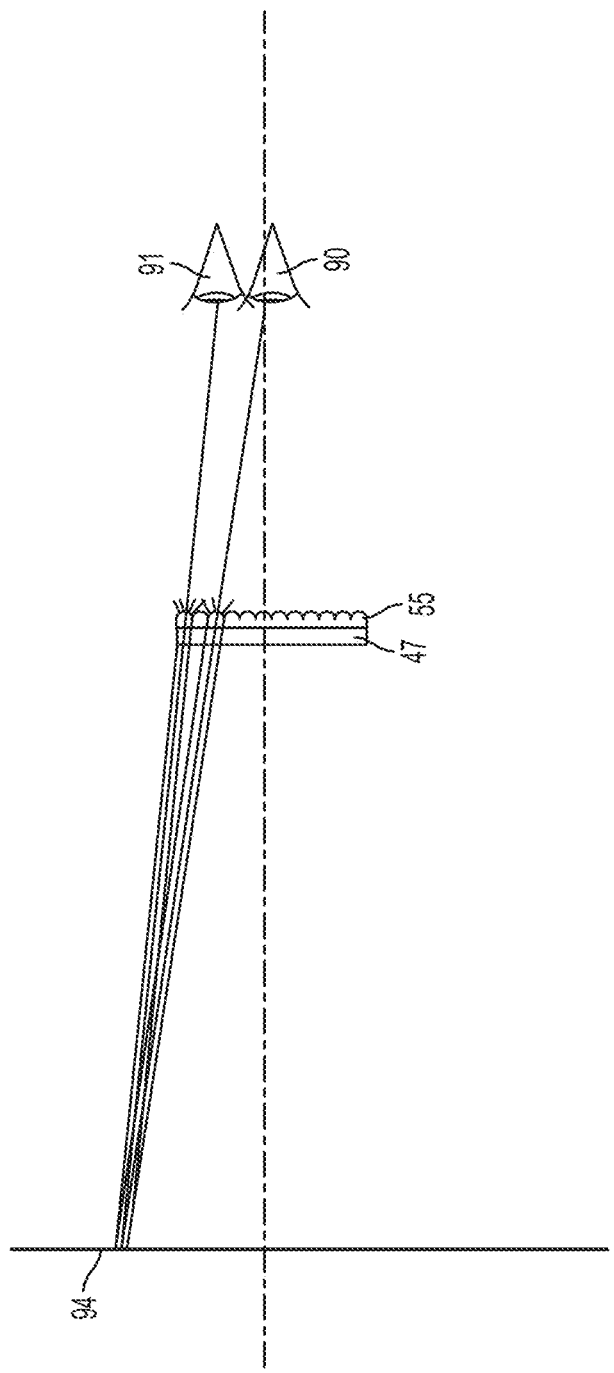
FIG. 14A shows a light field display comprising a thin film transistor (TFT) screen 47 (optionally there may be a LED display instead) and a micro lens array 55, wherein the display is viewed from different eye positions 90 and 91 by an observer, and wherein, when watching the same spot, the viewing angle of an observer changes when shifting his or her head, and the view is generated in a way that the image 94 appears as being virtually fixed (at a virtual distance) and framed by the display's frame.
Figure 14C:
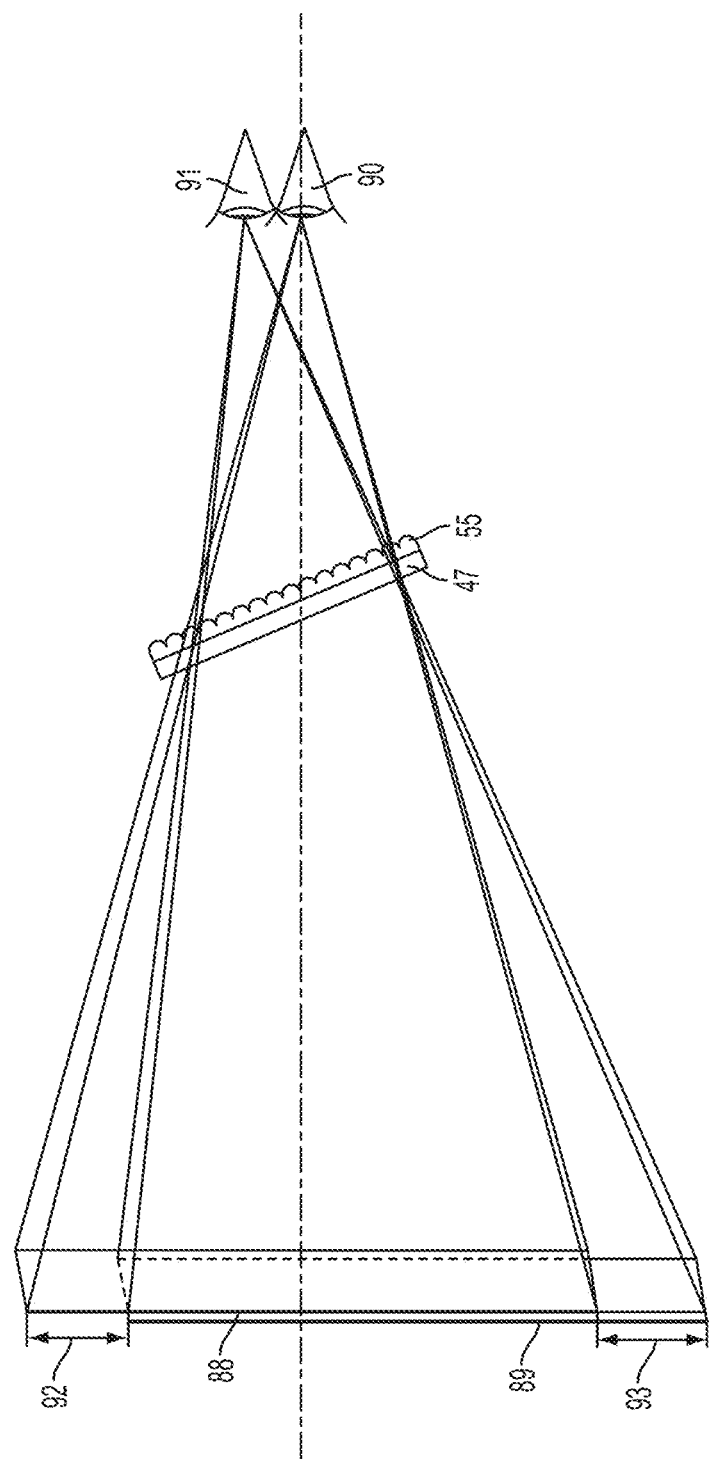
FIG. 14C shows a display similar to FIGS. 14A and 14B, where the view is generated in a way that the image appears as being virtually fixed and framed by the display's frame, where the view generation is adapted to be observed by a viewer looking out of an angle, and the virtual object planes are turned orthogonal to the observer.
Figure 14D:
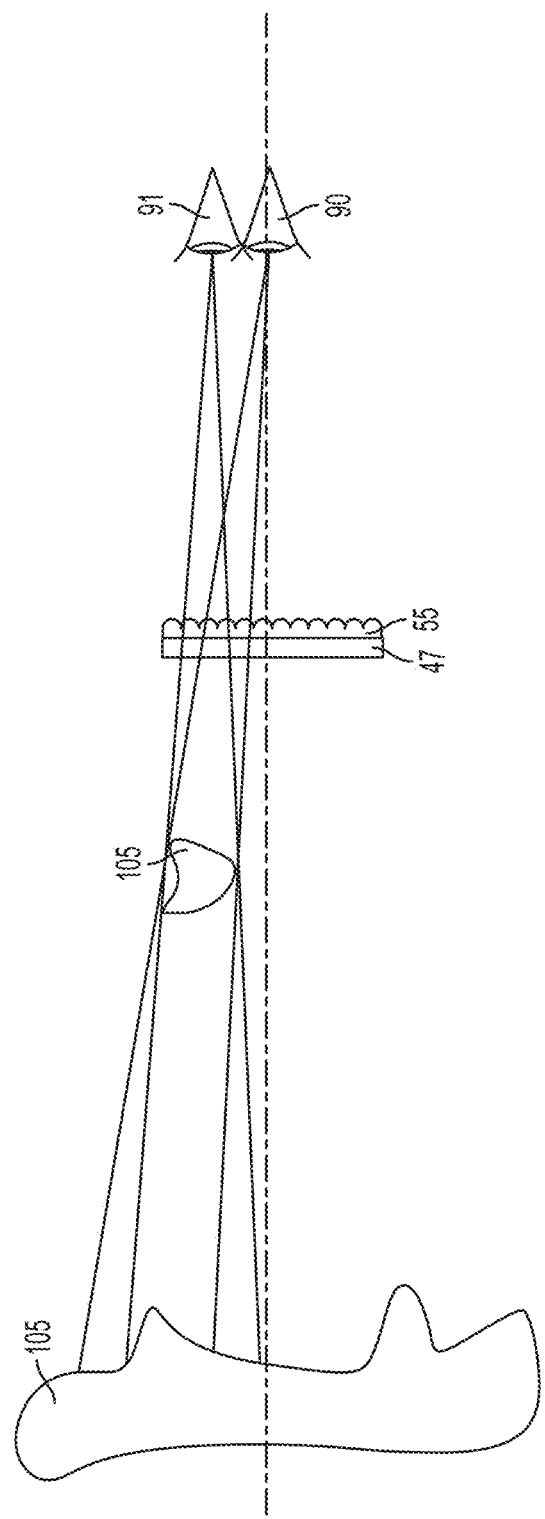
FIG. 14D shows a display similar to FIG. 14A, where the view is generated in a way that the image appears as being virtually fixed and framed by the display's frame, where two virtually displayed objects at different virtual distances are shown, wherein this example shows, by shifting his or her head and viewing angle, the observer sees portions of the object in the background which were occluded by the object in the foreground earlier, while other portions disappear, simulating object distance according motion parallax.

When observing two virtually displayed objects in different virtual distances (optionally matching or coming close to the distances of real objects which were captured by a camera or cameras or other sensor which images are used as source image input), the system may generate the view in a way that, when the observer is shifting his or her head, portions of the object in the background which were occluded by the object in the foreground earlier come into view, while other portions disappear (see FIG. 14D).

The second algorithm of how the virtually viewed content may be generated in specific as part of the invention may be done as follows with reference to FIGS. 15A and 15B.

The virtual image is generated in a way so as to be linked to the observer's eye position. Virtual objects shift as much (88 to 89) as the viewer's eye shifts (90 to 91). When generating virtual objects in the foreground and background, objects and surfaces of objects in the background hidden or occluded by objects in the foreground stay hidden or occluded in the same way since all objects may shift simultaneously as much as the observer's view shifts. Object angles and scales stay the same or substantially identical. When using this approach, one gets the impression that the same image content is seen from different eye positions.

While both approaches of specific view generation may support 3D view and 3D object view generation (see FIGS. 14D and 15B), 3D structures or scenes which may be provided from any 3D image source such as three dimensional camera system (bifocal camera, flight-of-light or other) may come into use. Alternatively, the 3D image information may be rendered artificially. Structure such as like a virtual 3D-arrow or the like may be generated and shown within the 3D light field display view. In case of using the second specific approach for the view generation, just the 3D impression out of disparity may be maintained. Only the first described algorithm provides a 3D impression out of disparity paired with parallax motion in reference to the viewer. Since in the second algorithm an object faces the identical surface to a viewer, the object may be rendered as a 2D imposter, wherein a 2D image turned orthogonal to the viewer, optionally under use of bump and displacement mapping, may have a more realistic impression. Using 2D imposters may save precious processing resources. To improve the performance of the first described algorithm, the imposters and bump- or displacement mapping may also optionally find use. Optionally, these may just be used when showing far distant objects while using more true 3D on virtually closer objects. The system thus may improve the visibility or discernibility of the displayed images or information (such as of an instrument reading at an instrument panel of the vehicle) by adjusting a local image pattern to the need of the occupant's eyes and responsive to the color dispersion of the human eye and allowing 3D impressions.

Figure 6A:
FIG. 6A shows a view into a vehicle cockpit with a head up display (turned on) in accordance with the present invention, which extends over the full dashboard width, showing a stitched rear view panorama image taken by three rear view cameras, reflected by the windshield and visible to the driver, and with vehicle cabin eye/head tracking cameras for tracking eye movement of the driver being present as well.
Figure 6B:
FIG. 6B shows a view into a vehicle cockpit with a head up display (turned on) installed in accordance with the present invention, with the display extending over the full dashboard and augmenting information from the navigation system and/or data derived from a front facing imager (for example traffic signs) and/or general vehicle data.
Figure 21:
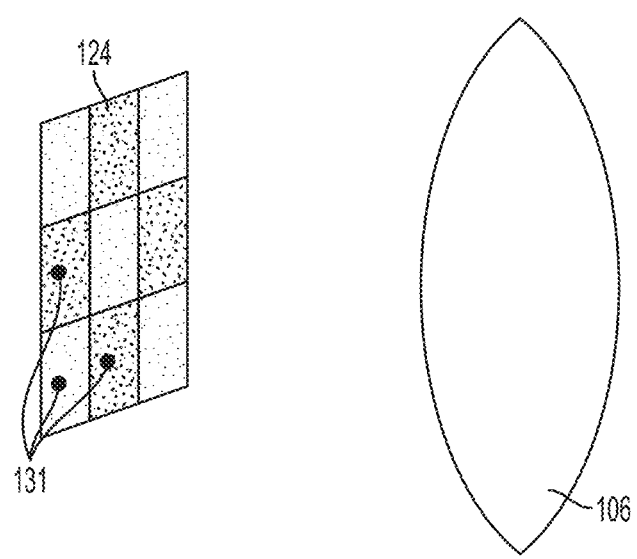
FIG. 21 shows a micro lens 106 with a pixel group 124 below, with the area of each pixel sending out the light homogeneously (131)
Figure 22:
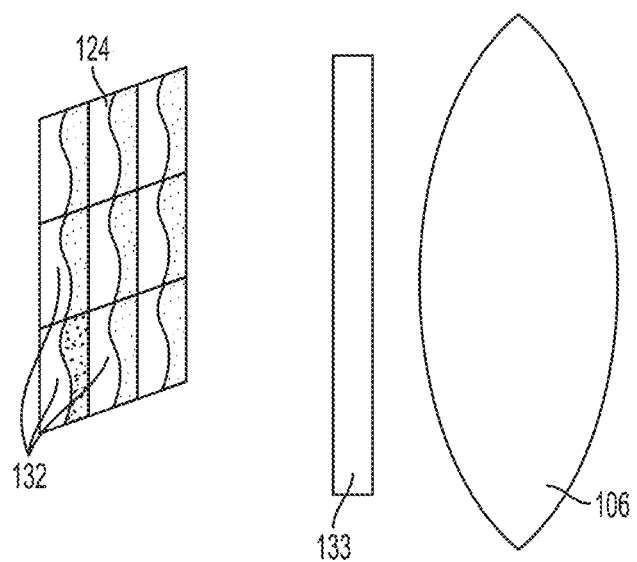
FIG. 22 shows a display with an inhomogeneous pixel area 132, whereby, in order to avoid artefacts it is necessary to homogenize the viewed area, and this may be done with an additional optical component 133 or an adequate optical design of the micro lens.

FIG. 14C indicates the situation where the incident angle is far off 90 degrees. This may be a requirement by the vehicle interior design for placing the light field display into the vehicle dash board (such as can be seen in the example of FIGS. 6A and 6B), head up display or projector system. In this case the source pixel's and micro lens may have to be assigned accordingly different (see FIG. 3C). The light field lens array may be tilted toward the line of sight of a viewer's eye towards a virtually displayed image (88, 89). For example, the micro lens array may comprise an orientation of micro lenses of the micro lens array to the display at about 0 degrees or at an angle of between about 30 degrees and about 60 degrees, such as, for example, at an angle of about 45 degrees (or other angle depending on the particular application). If the pixel area is inhomogeneous as indicated in FIG. 22 compared to FIG. 21, artefacts will arise. In order to avoid these artefacts, it may be necessary to add an additional optical element 133 or make an adequate optical design of the micro lens, thus homogenizing the seen or viewed pixels of the display. For example, an additional fine ripple may be added to the micro lens surface.

When considering more and more eye positions in these algorithms, one comes to a conflict, that a pixel has to be assigned which was already assigned by a former eye position. There are two possibilities to overcome this conflict:

a) A sufficient high number of pixels below each micro lens are provided (for example 5×5 pixels below each micro lens).

b) By head or eye tracking, the exact position of the observer is known. Only those eye positions are used for the assignment of source pixel to light field pixel which are near to the real eye position. The number of pixels below each micro lens can be kept low (for example 3×3).

Figure 18:
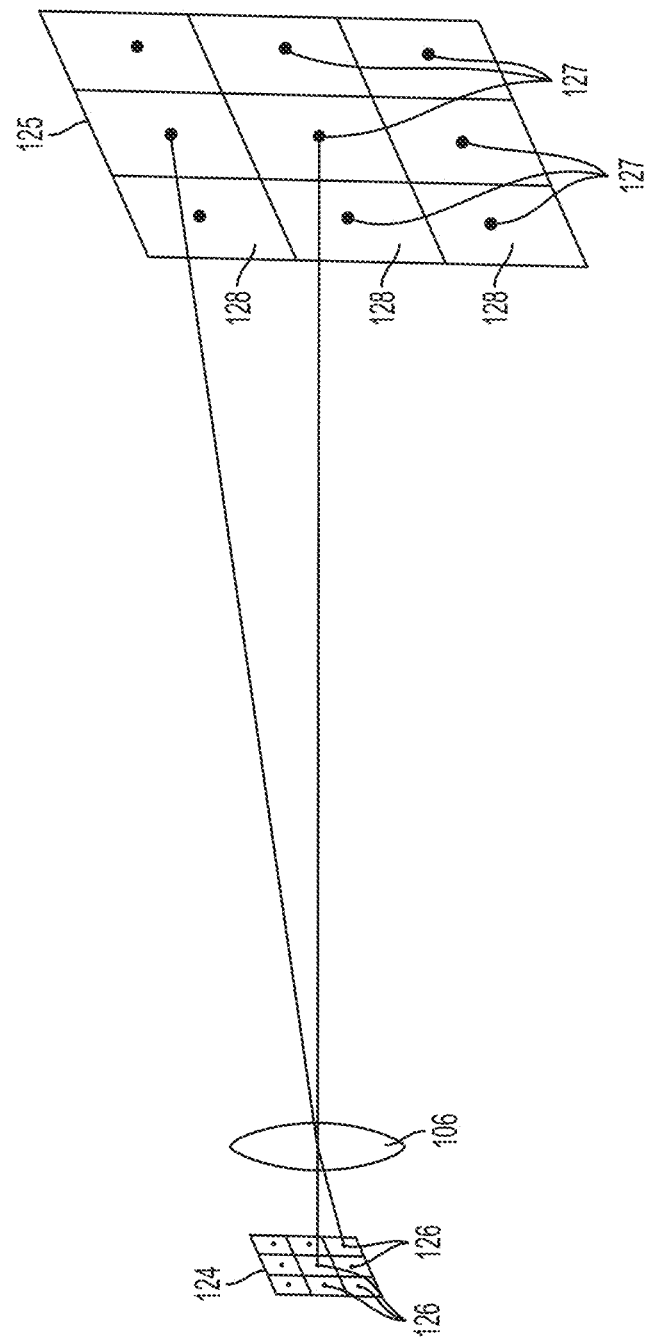
FIG. 18 shows the optical path from the pixel group 124 through a single micro lens 106 to the eye box 125, with the display pixel centers 126 and the eye positions 127 used for calculating light field look-up tables.
Figure 19:
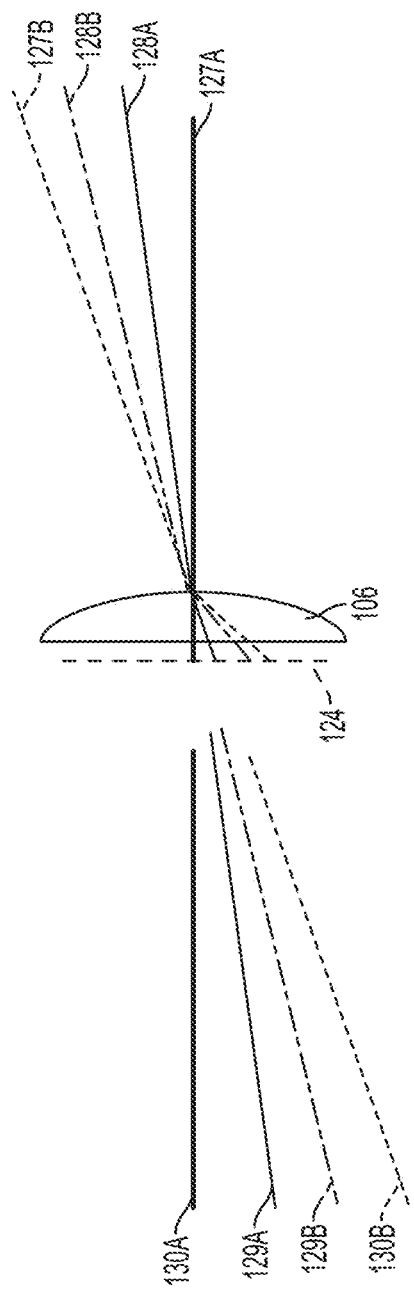
FIG. 19 shows display control behavior, such as when the virtual image content is virtually fixed, where image contents A and B are projected from the display pixels to the eye box.

FIG. 18 shows the optical path between the display pixel group 124 through the micro lens 106 to the eye box 125. One eye box segment is the projection of one single pixel. The display pixel group 124 may consist of 3×3 to 7×7 pixels, here 3×3 is assumed. The focal length of the micro lens is chosen in such a way that the eye box 125 gets the desired size. In the above described procedure, it was explained how to assign source image data to the display pixels of 124. But strictly speaking the construction principle is only valid for the projection of the center display pixel positions 126 to the center eye positions 127. What happens at the intermediate eye positions 128 has to be analyzed separately. Two cases have to be considered:

Case 1: The virtual image is positioned at a distance of about 1.5 m or more and appears fixed in space ahead on the road (see FIGS. 14A-D). FIG. 19 shows what happens when moving the eye through the positions 127A-128A-128B-127B. The seen image content A moves from the position 130A downward to the position 129A, remaining on the same display pixel. Then the image jumps and the image content B is seen at 129B which moves further down to the position 130B. In order to avoid these artefacts, additional processing steps are necessary as explained below.

Figure 20:
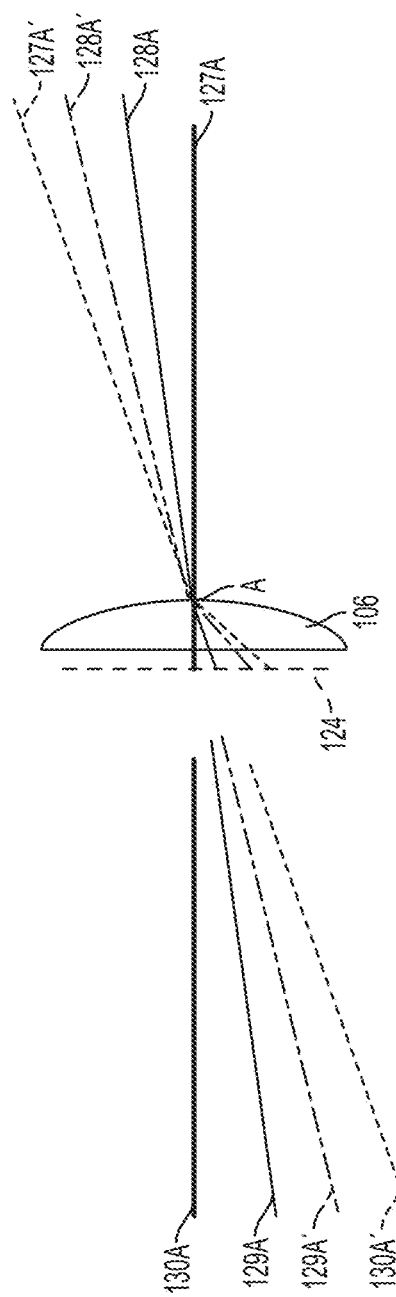
FIG. 20 shows the display control behavior such as when the image content A is fixed to the display location.

Case 2: The virtual image is also positioned at a distance of 1.5 m or more but the image is fixed at the display location (see FIGS. 15A and 15B). FIG. 20 describes what happens when moving the eye through the positions 127A-128A-128A'-127A'. The image content A moves smoothly and continuously down from position 130A to 130A' without any jumping. This is the desired behavior. No additional processing steps are needed.

In order to avoid the artefacts of case 1, eye position information is needed from head tracking:

First approach: Divide the eye box region 125 in many sub regions and determine look-up tables for each sub region. One of each sub region is used for one different eye position.

Second approach: Calculate the light field look-up tables similar to case 2 and shift the display image content by multiples of the lens pitch depending to the measured shift of the head.

Third approach: Calculate separate look-up tables for both eyes by using the next laying node 127. These two look-up tables are shifted by multiples of the lens pitch to compensate the shift shown in FIG. 19. The two look-up tables are then merged into one. Since the optical path from each eye onto the pixels under each micro lens ends up at different pixels, different image contents can be generated simultaneously for each eye without interfering, in case the eye box segments are small enough.

Figure 23:
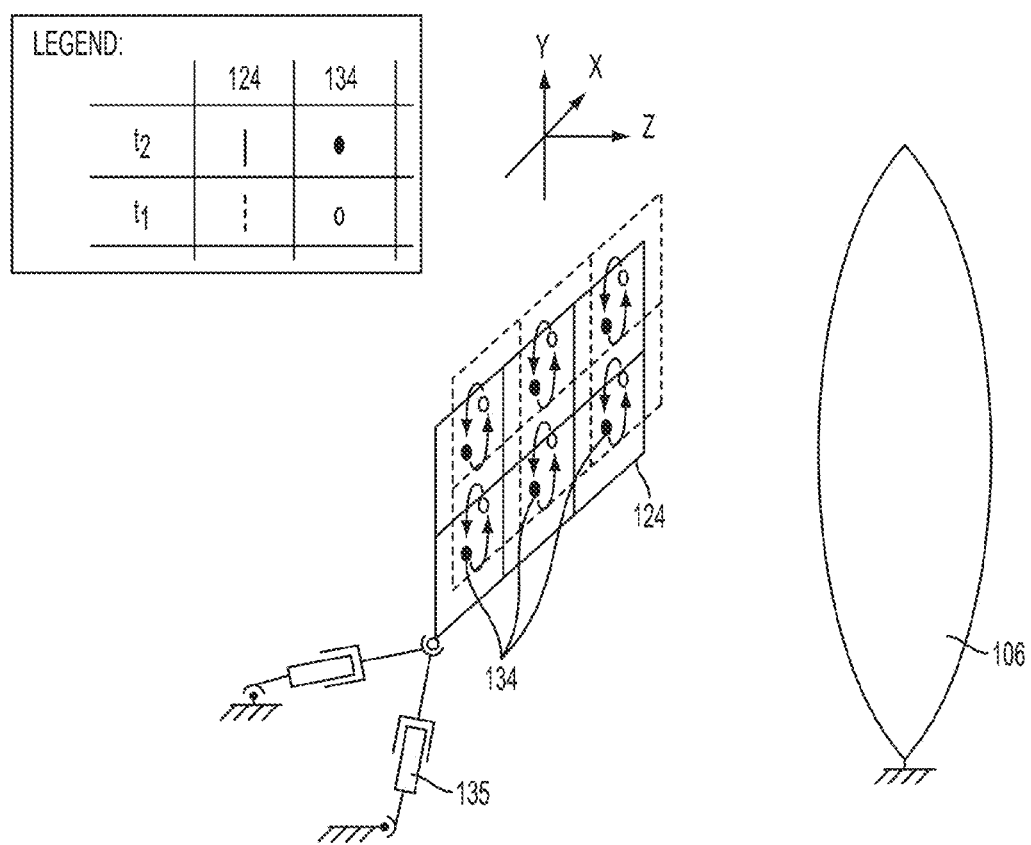
FIG. 23 shows a display of the present invention that yields light spots 134, which are much smaller than the pixel pitch, for example a LED array, wherein by moving the display in x- and y-directions with a piezo actuator 135, it is possible to get a much higher effective display resolution.

Fourth approach: An LED array is used where the LED light diameter is much smaller than the pixel pitch. By moving or vibrating this LED array with a piezo motor in the x- and y-direction similar to the solution described for head mounted, close to eye light field solution for both eyes separately, the resolution can be increased strongly. The x-y movement may be less than the pixel pitch. The pixel size may be chosen relatively small compared to its surrounding pitch space. Interpixels may be generated on any desired position by timed switching. The matching LEDs are only switched on when it is at the adequate location (see FIG. 23 possibly on multiple positions). Optionally, the micro lens array may have a ratio of lens pitch to pixel pitch of between about 3 and 7.

Figure 9A:
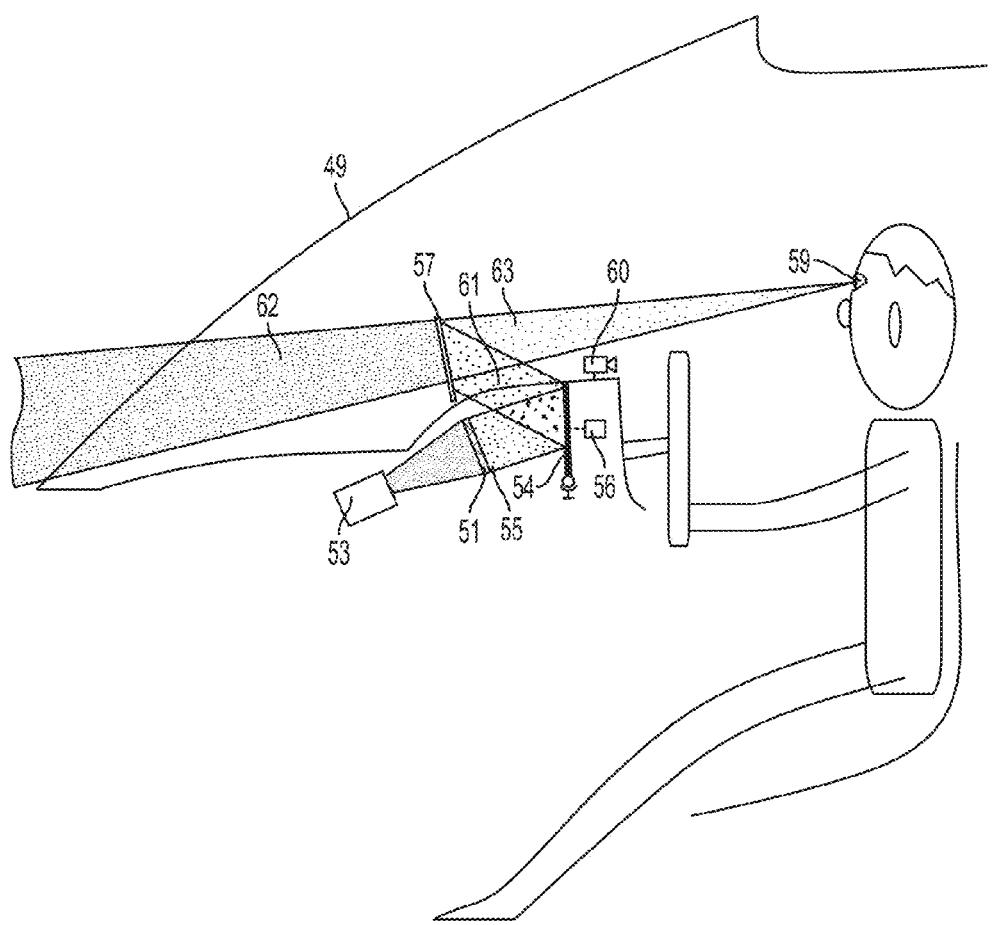
FIG. 9A is a side elevation and schematic showing a dashboard combiner head up display of the present invention, similar to that in FIGS. 8B and 9A, having a turnable mirror and mirror actuator for altering the light beam path for tracking the head box according the driver's head, as detected by an in cabin camera, shown with a projector and a translucent diffusor in use.
Figure 9B:
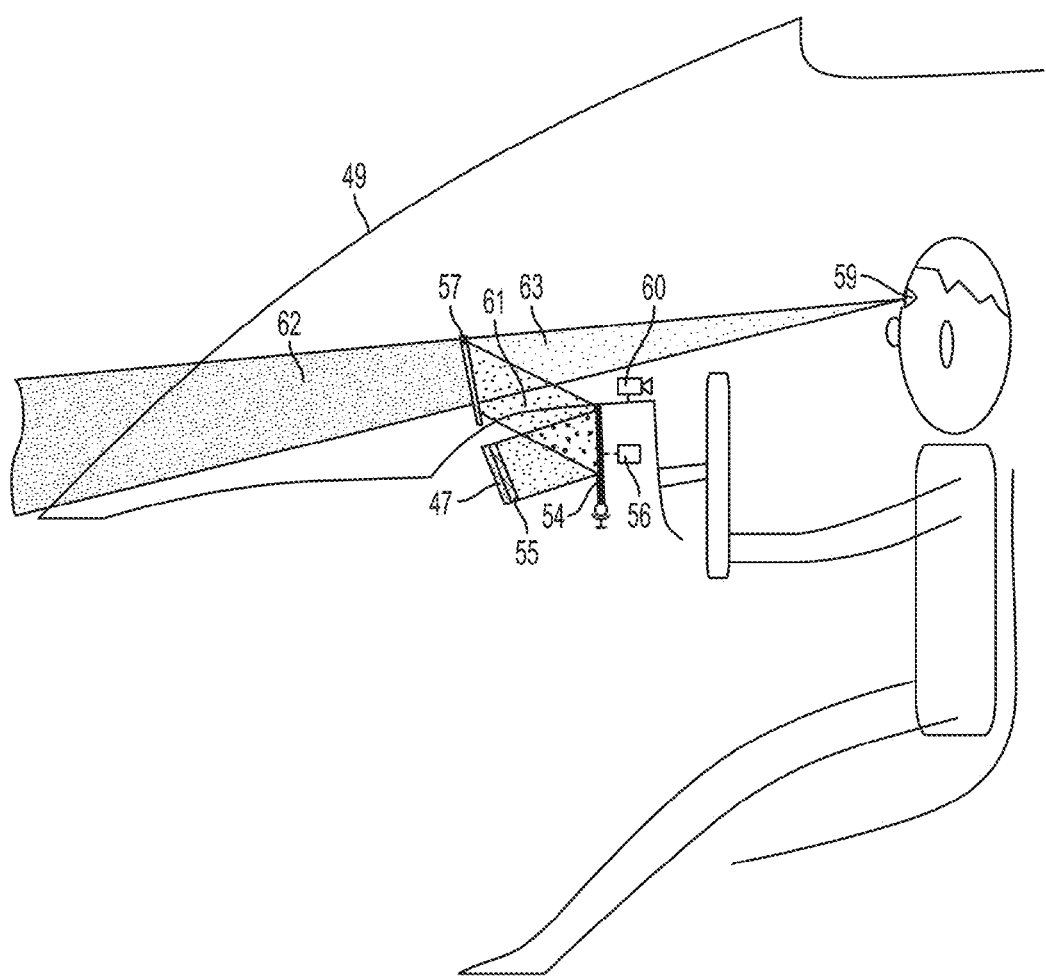
FIG. 9B is a side elevation and schematic showing a dashboard combiner head up display of the present invention, similar to that in FIGS. 8B and 9A, having a turnable mirror and mirror actuator for altering the light beam path for tracking the head box according the driver's head, as detected by an in cabin camera, shown with a TFT in use as the display.
Figure 9C:
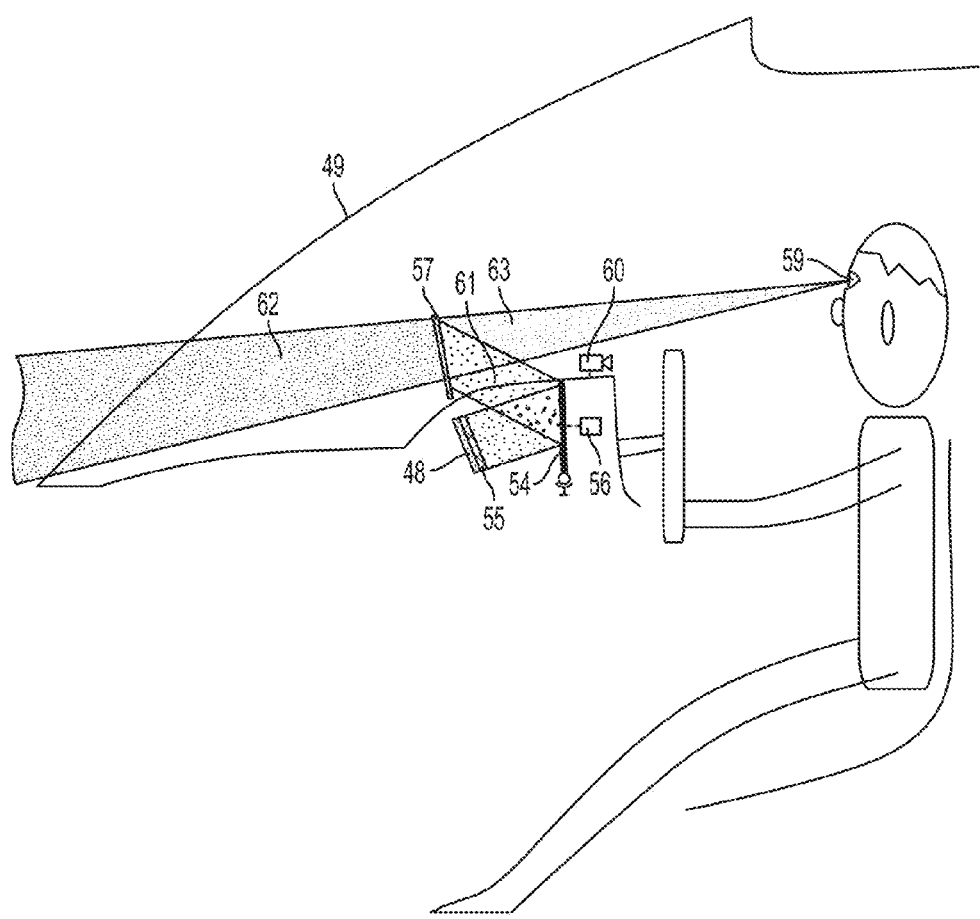
FIG. 9C is a side elevation and schematic showing a dashboard combiner head up display of the present invention, similar to that in FIGS. 8B, 9A and 9B, having a turnable mirror and mirror actuator for altering the light beam path for tracking the head box according the driver's head, as detected by an in cabin camera, shown with a LED in use as the display.
Figure 24B:
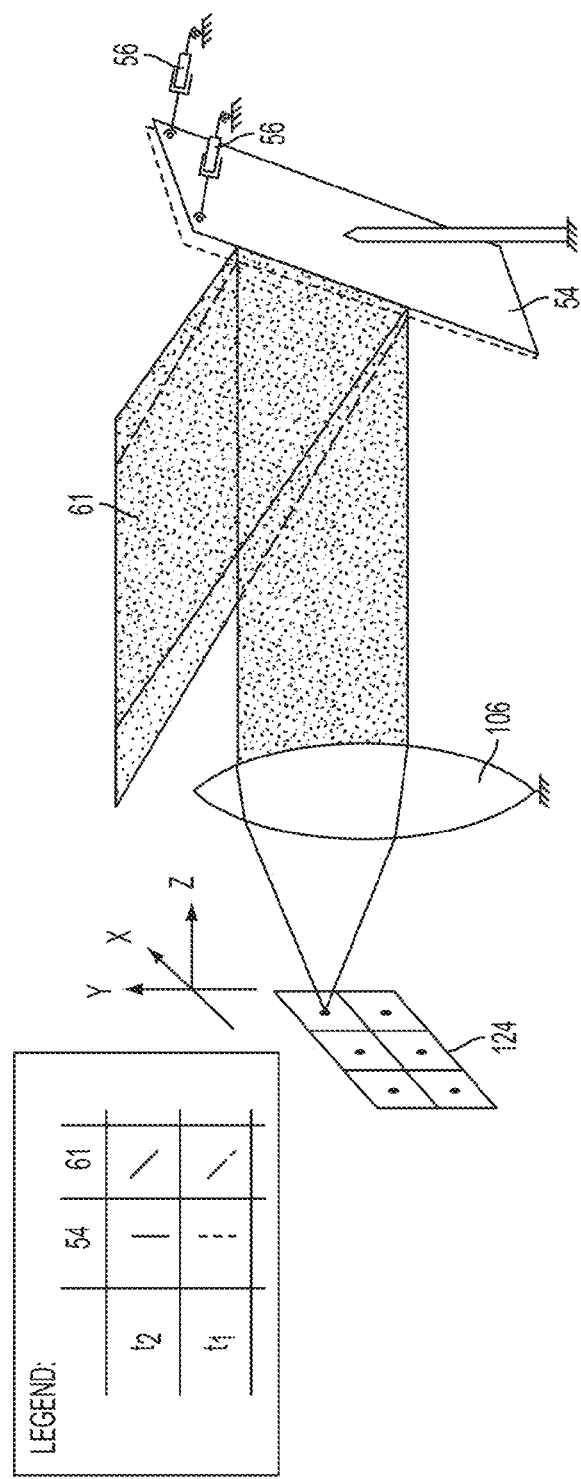
FIG. 24B shows the display from FIG. 24A with the light beam 61 reflected in a direction or angle at $t_1$ and, when the mirror is turned or adjusted at $t_2$, in a different direction or angle.

Fifth approach: As can be seen in FIGS. 24A and 24B, along the optical path and in the beam 61 between lens array 106 and the viewer may be a movable mirror element that may wobble periodically or may be rapidly controlled. By timed switching of fixed LED pixels, interpixels may be interpolated. This is similar to the fourth approach with the difference that it is not the pixel plane that wobbles or is adjusted but instead it is a reflective element in the light beam that wobbles or is otherwise adjusted or tilted or angled. The mirror's angle changes may be in the range of a +/−a half pixel's opening angle. The mirror may wobble in a microscopic range in a fast way for interpixel interpolation. When combined with the solutions of FIGS. 9A-C (and FIGS. 5A-D), the same mirror element may be controlled by the same or additional actuators for head/eye-box tracking. Optionally, there may be two movable mirror elements in the light beam path a first for interpixel interpolation and a second for head/eye-box tracking.

Figure 25:
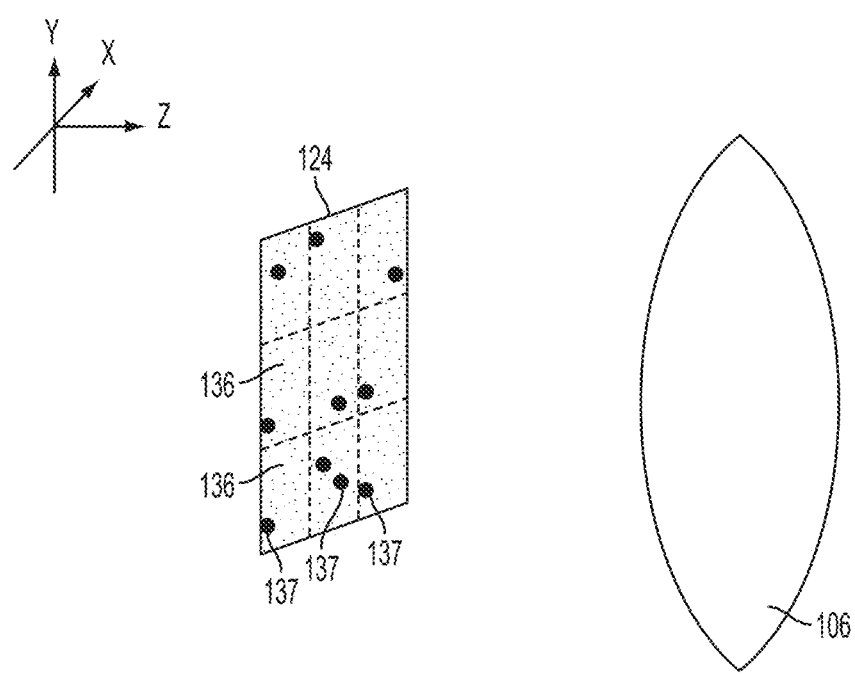
FIG. 25 shows a display of the present invention which contains a high amount of LEDs 136,137 or similar, with only a small portion of the LEDs 137 being switched on, which helps to save electrical power and limit heating of the display.

Sixth approach: An LED array with a high number of (fixed) LEDs below each single micro lens (for example 25×25 LEDs) is used. Only those LEDs are switched on which yields matching light rays for the right respectively left eye. This helps to save electrical power consumption and keeps the heating up of the LED array limited (See FIG. 25).

The assembly is capable to produce an image off the axis of the lens array's lenses. In the example of FIGS. 6A and 6B, the curved windshield is used for reflecting the image from the light field display on the dashboard. Optionally, the view distortion occurred by the windshield's curvature may be compensated by generating a distorted display image which is seen undistorted (and upright) when seen as a reflection from the windshield. The vehicle tachometer, speed limit, fuel level indicator and blinker indicator overlay's (2D or 3D) of the example of FIG. 6B appear pleasant in the reflection, while being distorted when looking on the light field display in a direction from overtop.

A digital signal processor unit (DSP) can be used for converting image source data into light field data and for writing this data into the display. For higher resolution displays, it may adequate to use dedicated hardware like a FPGA or an ASIC.

Figure 4A:
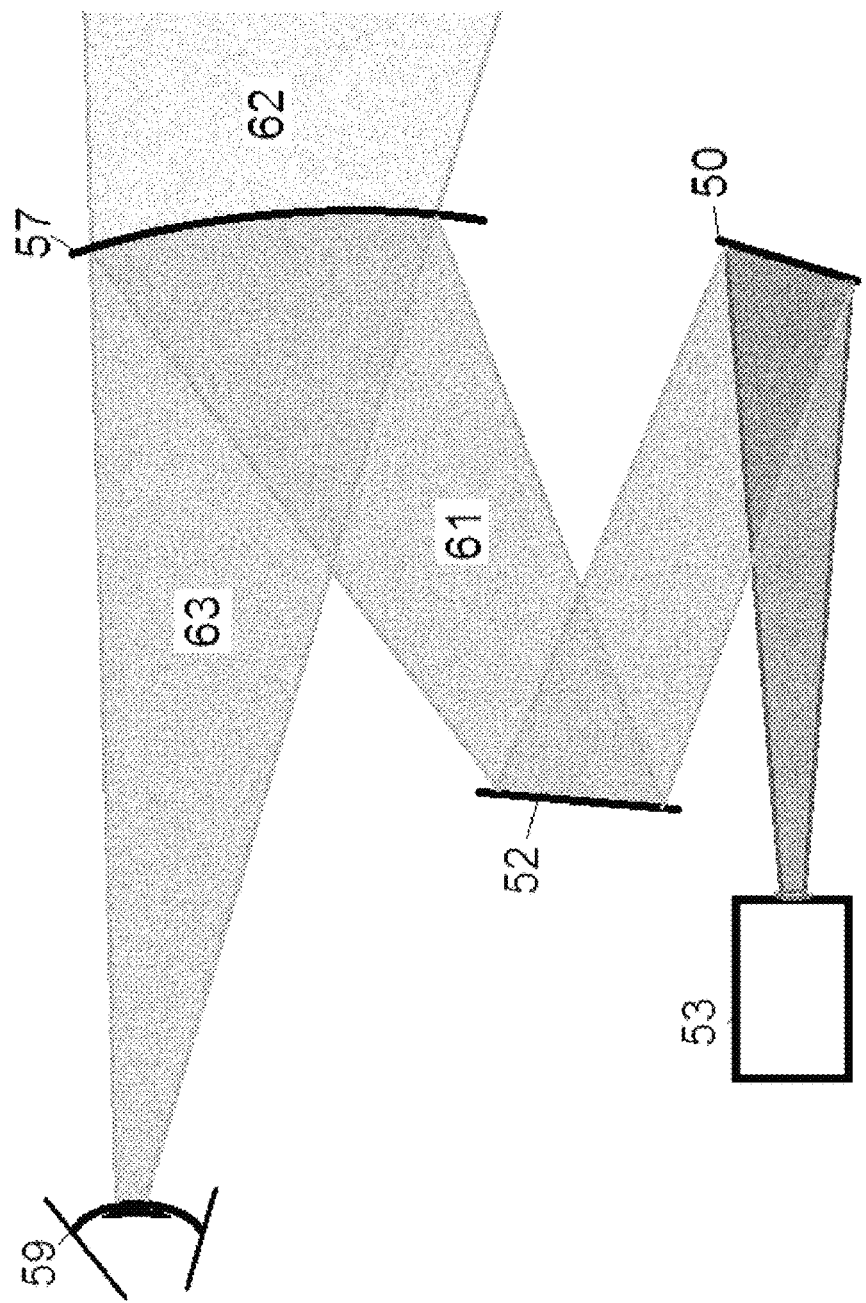
FIG. 4A shows a head up display with combiner.
Figure 4B:
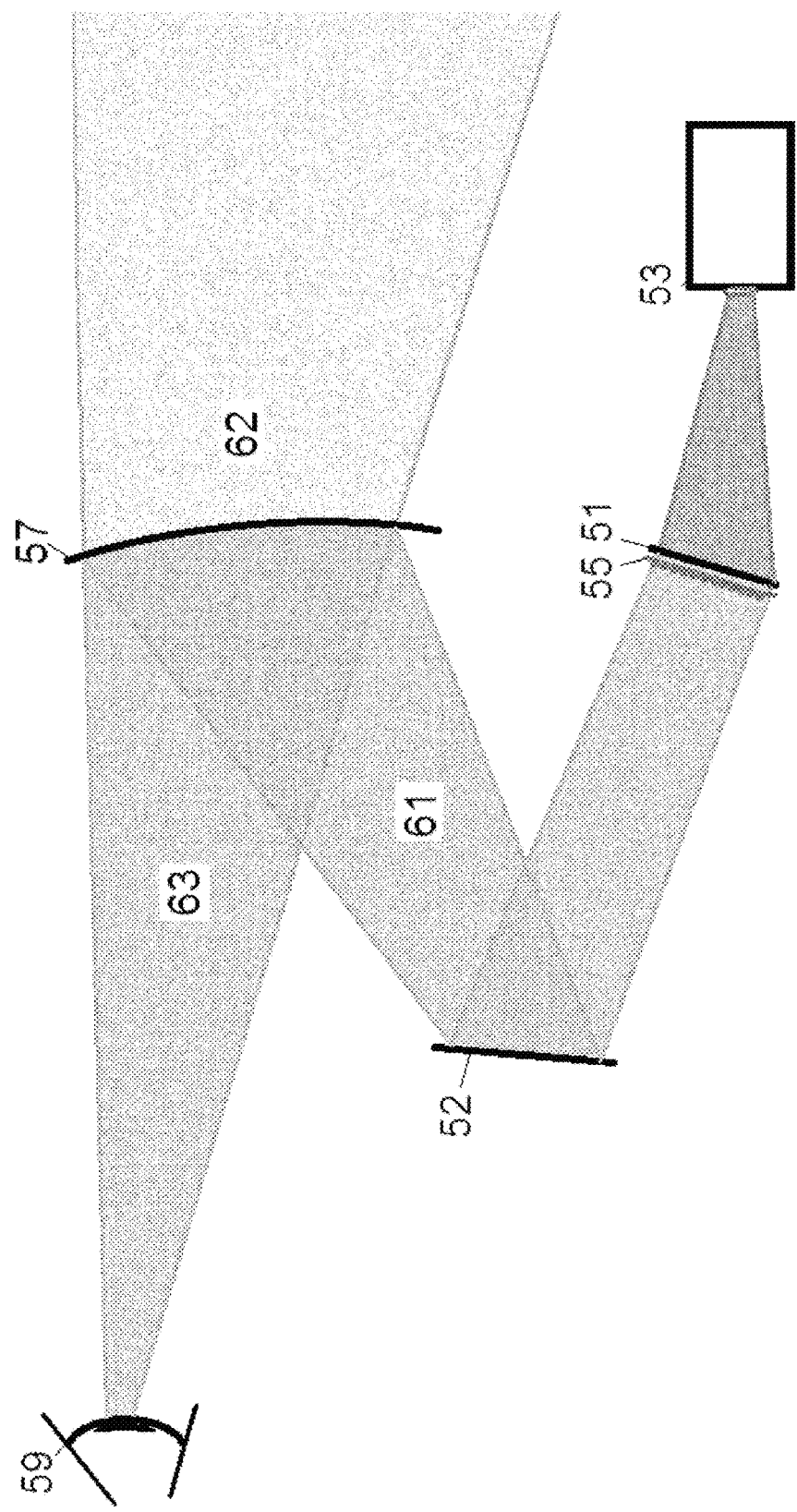
FIG. 4B shows a head up display with combiner and diffusor that uses a micro lens array for generating a light field projector in accordance with the present invention.
Figure 4C:
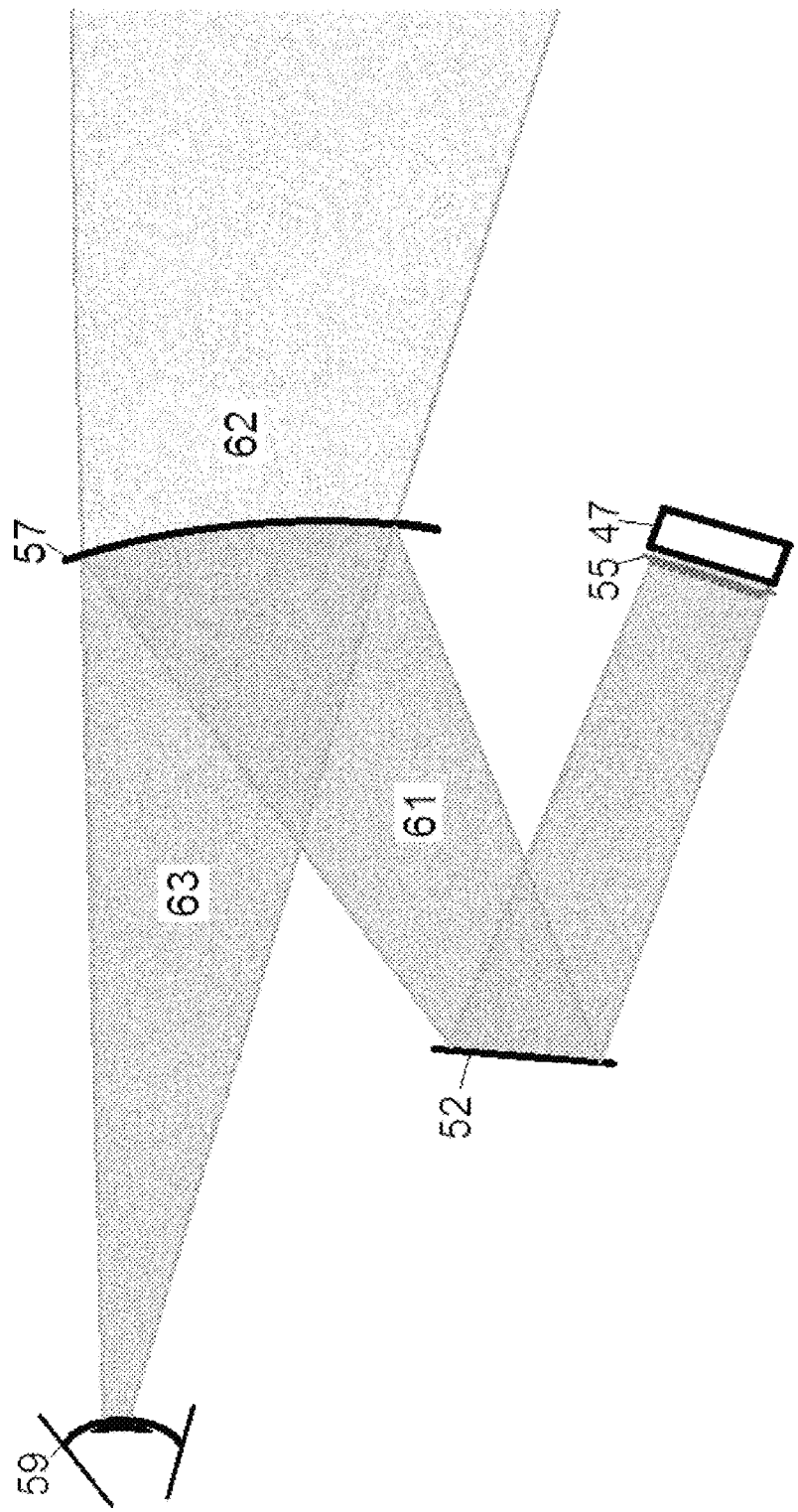
FIG. 4C shows a TFT-based head up display with combiner that uses a micro lens array for generating a light field in accordance with the present invention.
Figure 4D:
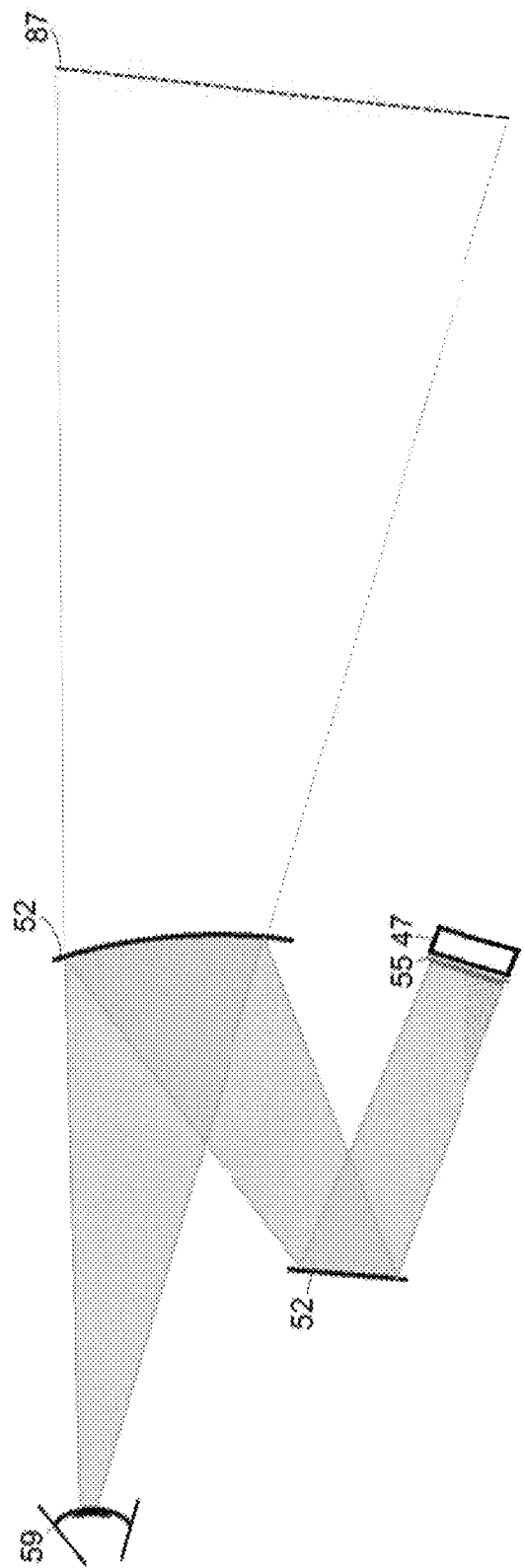
FIG. 4D shows the light field display assembly of FIG. 4C, additionally showing one virtual image plane (showing two dimensional (2D) images, with multiple planes used when showing three dimensional (3D) images)
Figure 5A:
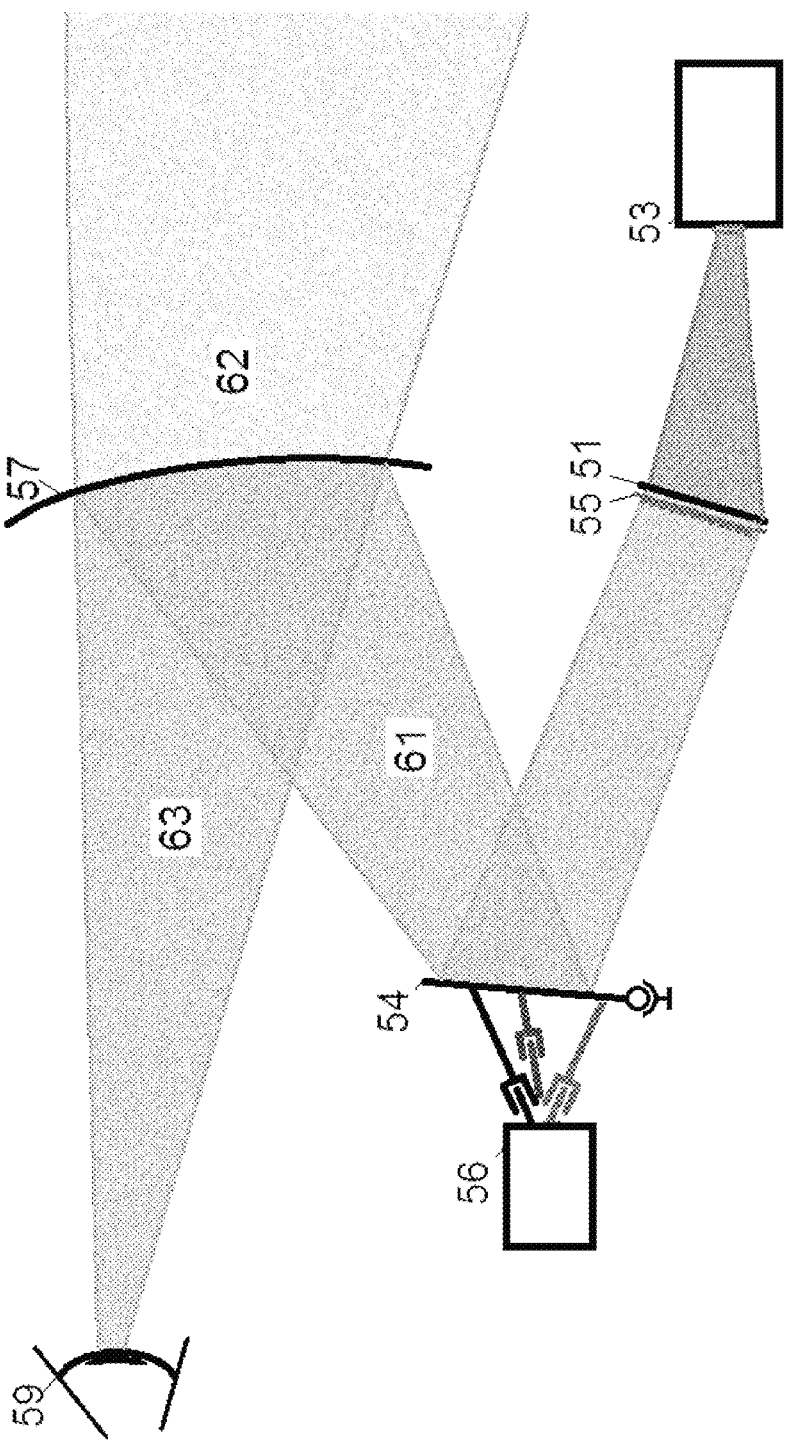
FIG. 5A shows a combiner head up display similar to the shown in FIG. 4A, having a mirror element turnable or adjustable in two directions or about two axes (optionally three dimensions) for tracking the viewer's eyes (or head) in accordance with the present invention, showing a projector and a translucent diffusor.
Figure 5B:
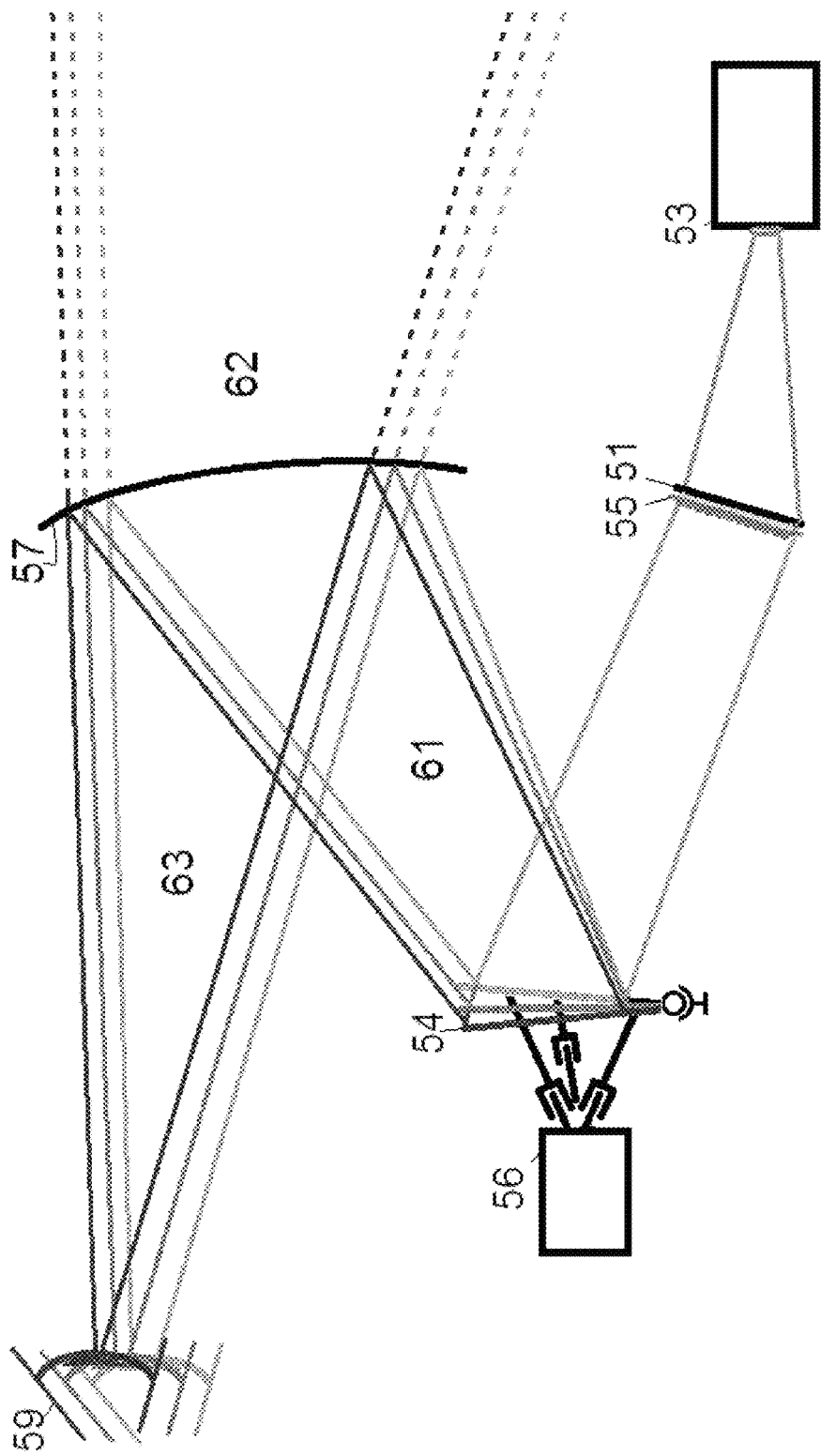
FIG. 5B shows light rays for different positions of the viewer's eyes and mirror element of FIG. 5A in different gray shadings, shown with a projector and a translucent diffusor.
Figure 5C:
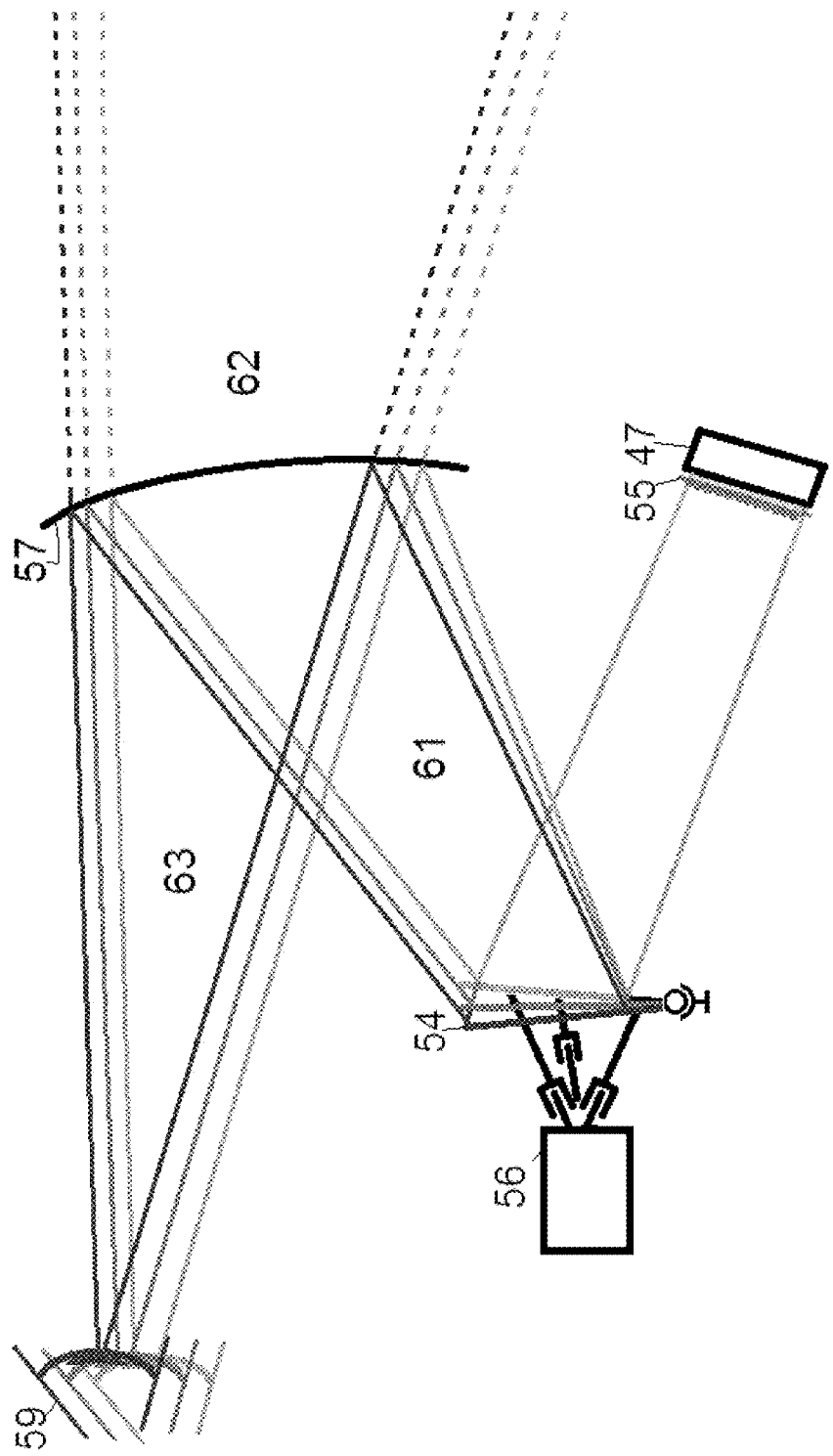
FIG. 5C shows light rays for different positions of the viewer's eyes and mirror element in different gray shadings, shown with a TFT as the display.
Figure 5D:
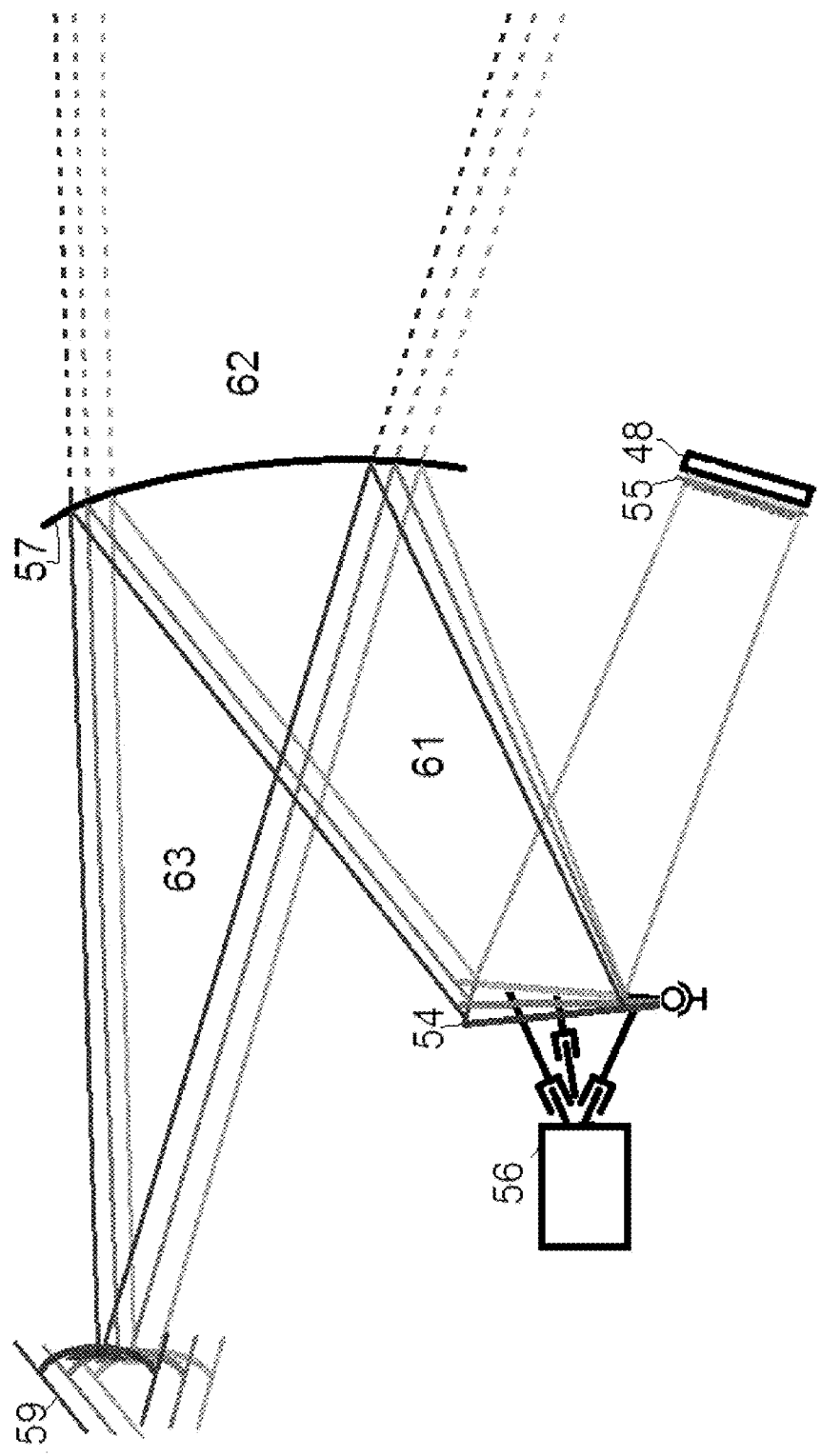
FIG. 5D shows light rays for different positions of the viewer's eyes and mirror element in different gray shadings, shown with a LED display.

FIG. 4A shows the basic principle designs of combiner head-up displays without a light field function. FIGS. 4B and 4C show two principal designs of combiner head-up displays with a light field function in accordance with the present invention. With FIG. 4B, the image is projected on a diffusing plate 51, while the virtual image is appearing in a distant plane to the viewer, see FIG. 4D. The optical elements 52 project or reflect the image toward a viewer's eye 59 (via the optical path 61-63. In FIG. 4C, the image is generated by a flat monitor (for example a TFT display 47 or a LED display 48 or the like). According to the present invention, a micro lens array 55 is added compared to conventional head up systems. Furthermore, a specific local image pixel pattern is provided. The combination micro lens array and local image pattern creates the behavior of a light field display. The system of the present invention yields the following advantages:

A three dimensional image instead of a two dimensional image can be provided to the viewer.

The task to shift the virtual image distance above about 2 m can be shared between the head-up optics and the light field display, thereby allowing a more compact optical design.

By changing the local image pattern, image properties can be adjusted to the personal needs of the viewer such as, for example, virtual image distance and eye box location.

As shown in FIGS. 5A-D, 8C, and 9A-C (and under certain circumstances see also FIGS. 24A and 24B), the combiner head up may have a mirror element turnable and/or shiftable (steerable) in two directions (optionally in three dimensions) for tracking the viewer's eyes (or head), the so called "head box." The optical paths (between the viewer's eyes and the display screen or projector) may be steered by altering the reflective direction of the first mirror element. Optionally, the optical path may be altered by shifting and turning the display element. Optionally, the optical path may be altered by turning the second mirror element (since the windshield may not be turnable) such as turning and shifting the combiner. In some of these solutions it may be necessary or desirable to turn the source images electronically or to turn the display element to avoid the viewed image turning when the reflective elements or displays gets turned for tracking the driver's eyes (such as by utilizing aspects of the systems described in U.S. provisional application Ser. No. 62/260,759, filed Nov. 30, 2015, which is hereby incorporated herein by reference in its entirety). The head eye tracking cameras 60 are shown, for example, in FIGS. 6A, 8C, and 9A-C, but would be included in the system to track the movement of the viewer's eyes. In International Publication No. WO 2005/121707 (which is hereby incorporated herein by reference in its entirety), a head up display was suggested with a movable mirror element movable in one dimension. In there the mirror was used for tuning the optical depths of a single point of a vehicle head up display, not for head tracking. In there it was suggested to generate a light spot which periodically draws a line between close and far distant areas for indicating the dedicated path of a navigation system.

In the system of the present invention, the mirror is for tracking the viewer's or viewers' eyes (and head box), not for generating the optical or virtual depths. The enhanced depth tuning is provided by tuning the light field's parameters according to the (real) distance and position of the viewer's or viewers' eye pairs. From advanced entertainment display devices it is known to track multiple viewers and to generate a 3D vision for each viewer's eye pair individually. Usually these work under use of lenticular lens arrays (such as, for example, the display of the Fujifilm Finepix Real 3D camera) or under use of parallax barriers (such as, for example, as used in the Nintendo 3 DS handheld console). These devices do not employ eye defect compensation. Additional for a viewer is the convergence plane isn't identical with the accommodation plane which may make it unpleasant to look at for longer time, when not used to it. Similar to the entertainment systems, the system of the present invention may employ eye tracking of multiple users for generating a custom view individually. The system of the present invention also provides a view generation that may employ the convergence and the accommodation plane as being on the same (focal) plane (87) and additionally being able to compensate for eye defects of each viewer individually.

Figure 7A:
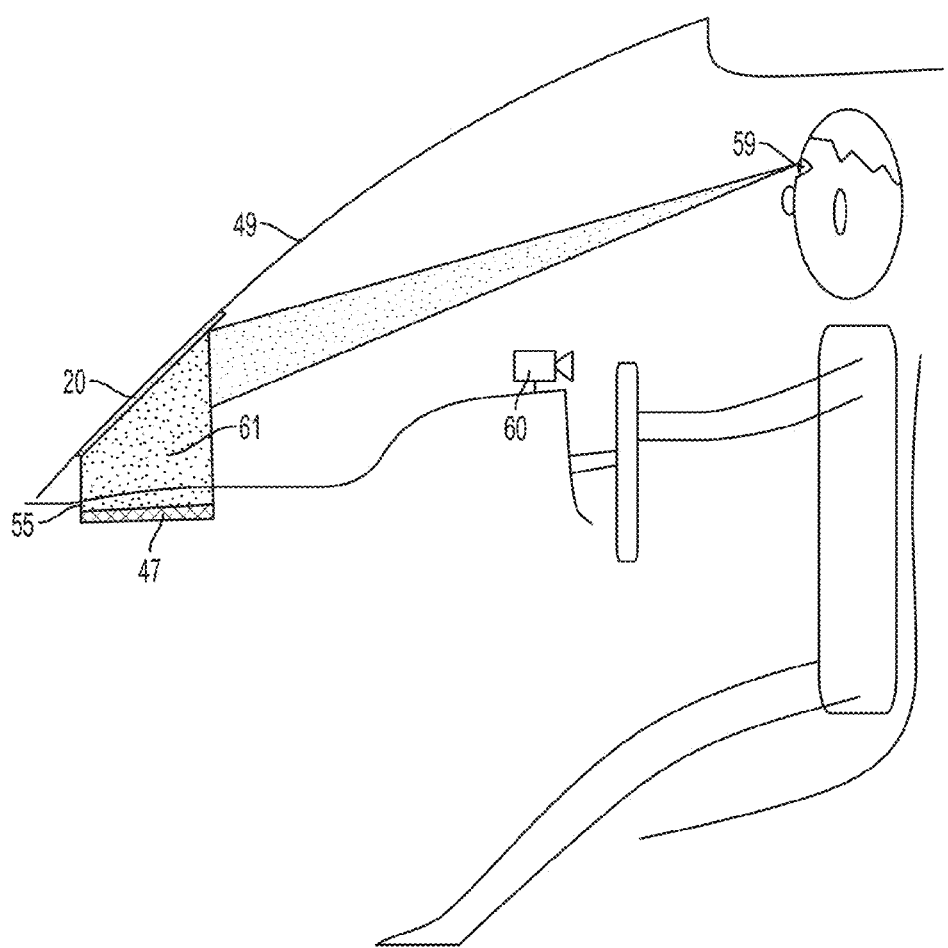
FIG. 7A is a side elevation and schematic showing a windshield head up display of the present invention using a TFT display at a time when the display is turned on and an optional darkening film or layer or element or foil 20 is tuned to dark (rearward vision augmentation)
Figure 7B:
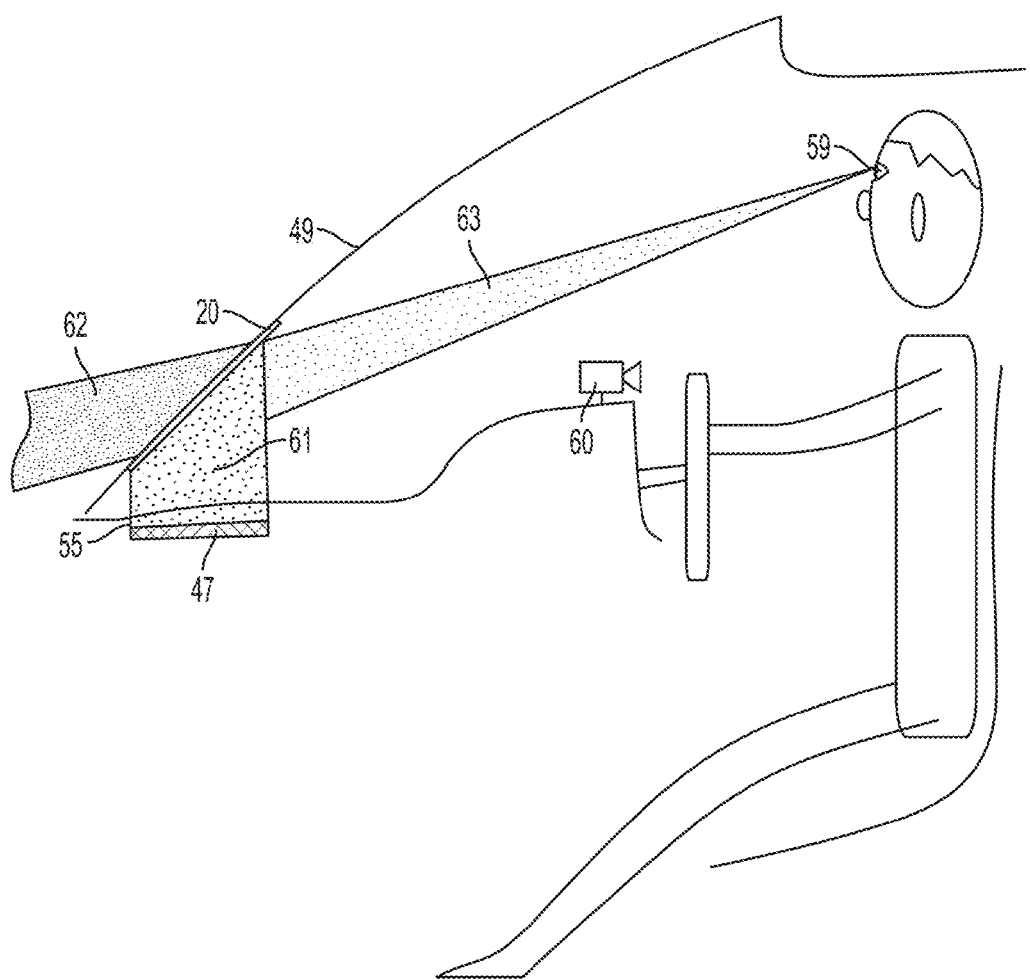
FIG. 7B is a side elevation and schematic showing a windshield head up display of the present invention at a time the display is turned on and the optional darkening foil 20 is tuned to translucent (forward vision augmentation)
Figure 7C:
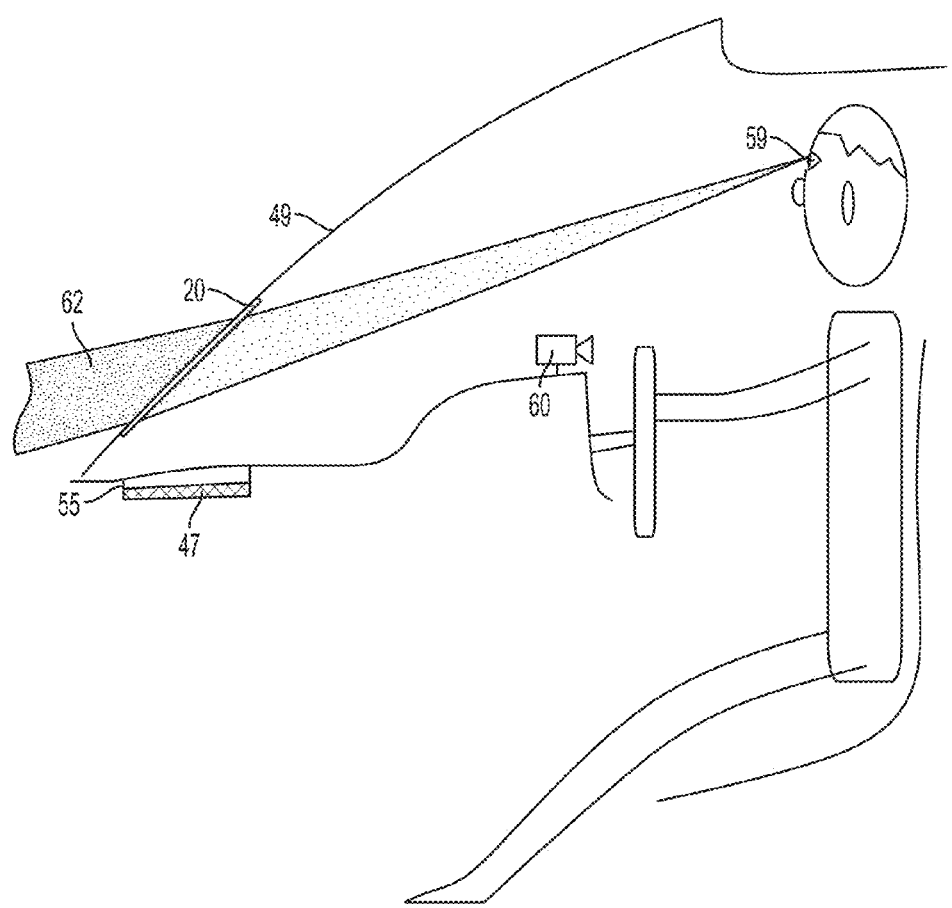
FIG. 7C is a side elevation and schematic showing a windshield head up display of the present invention at a time the display is turned off and the optional darkening foil 20 is tuned to translucent (off mode)

FIGS. 6A, 6B, and 7A-C show a windshield 49 head up display within a vehicle cockpit or cabin. Two eye/head tracking cameras 60 are installed within the dashboard. For improving the contrast, a blackening foil or film or coating or element 20 may optionally be installed or disposed at the windshield and may be engaged when the head up display is active, such as by utilizing aspects of the systems described in U.S. Publication No. US-2015-0232030, which is hereby incorporated herein by reference in its entirety. FIG. 6A refers to the application of showing a panoramic rear view image created by several rearward viewing cameras whereby the images are stitched together. When the head up display is inactive, the blackening foil 20 may be tuned to be translucent or non-darkened or non-opaque, such as shown in FIG. 7C. The driver is then able to look through the area of the foil 20 in the same way as the rest of the windshield 49.

Figure 13:
FIG. 13 shows a dashboard vehicle cabin light field display and two eye/head tracking cameras 60 for tracking head and eye movement of the driver of the vehicle in accordance with the present invention, with the light field display showing a stitched rear view panorama image taken by three rear view cameras (one camera (1) on the driver side, one on the passenger side and one at the rear of the vehicle), where the captured scene's depth is being reproduced by the light field display.

When the blackening foil 20 is tuned to be non-translucent or darkened or opaque and the head up (TFT) display 47 (or optionally an LED display) is turned on, the projected image may be a rear view vision, which is meant to not be augmented with the forward view such as to be seen in FIG. 7A. In this example, the head up display displays a seamless side-rear view panorama image 45 generated (in real time) by morphing and stitching images 41, 42 from the vehicle side cameras and images 43 from the vehicle rear camera, as shown in the example of FIGS. 6A and 13. The rear vision may be produced in 2D or 3D by multiple cameras utilizing aspects of the systems described in U.S. patent application Ser. No. 14/946,853, filed Nov. 20, 2015, now U.S. Pat. No. 10,127,463, which is hereby incorporated herein by reference in its entirety.

Figure 7D:
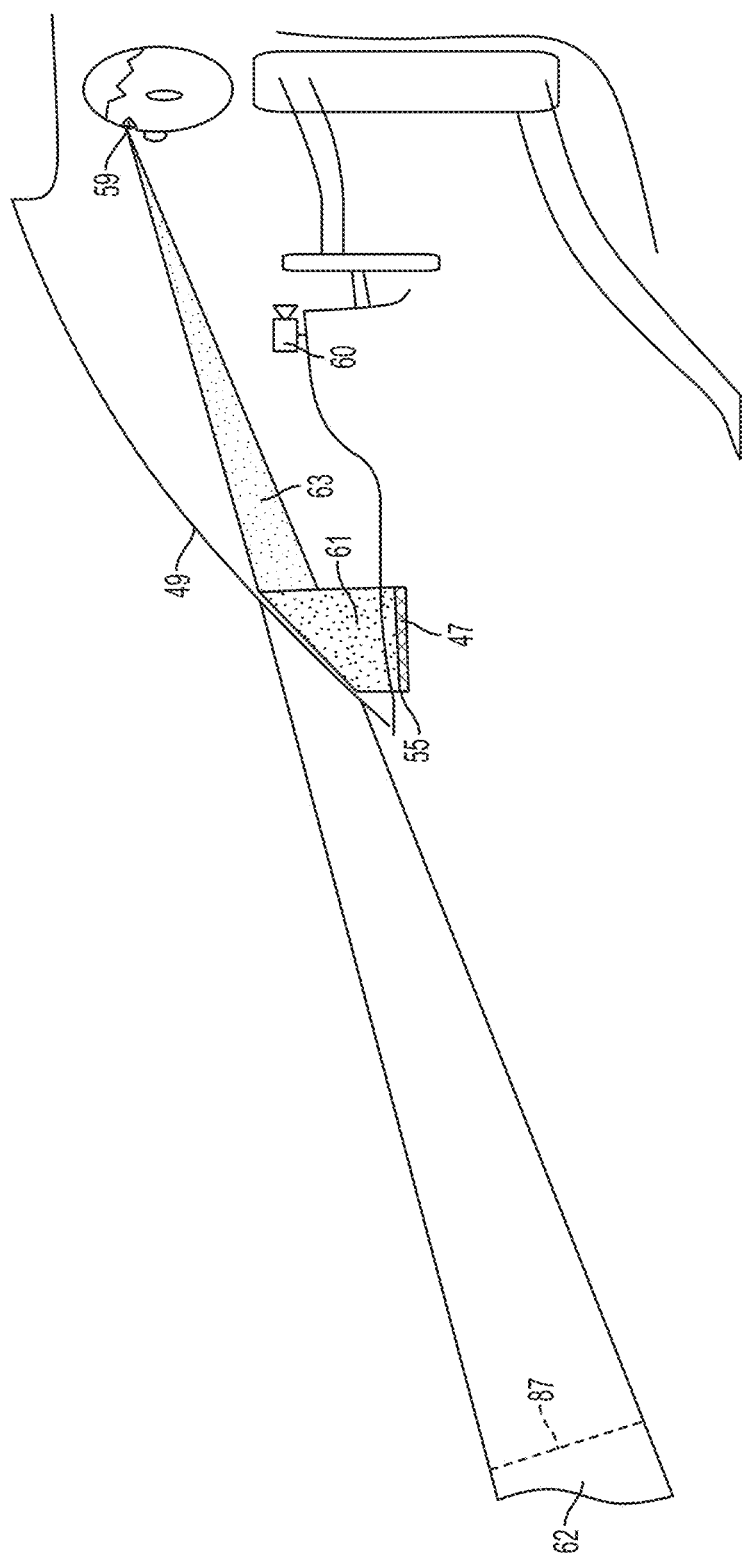
FIG. 7D shows the light field head up display assembly of FIG. 7B and additionally shows the virtual image plane.
Figure 7E:
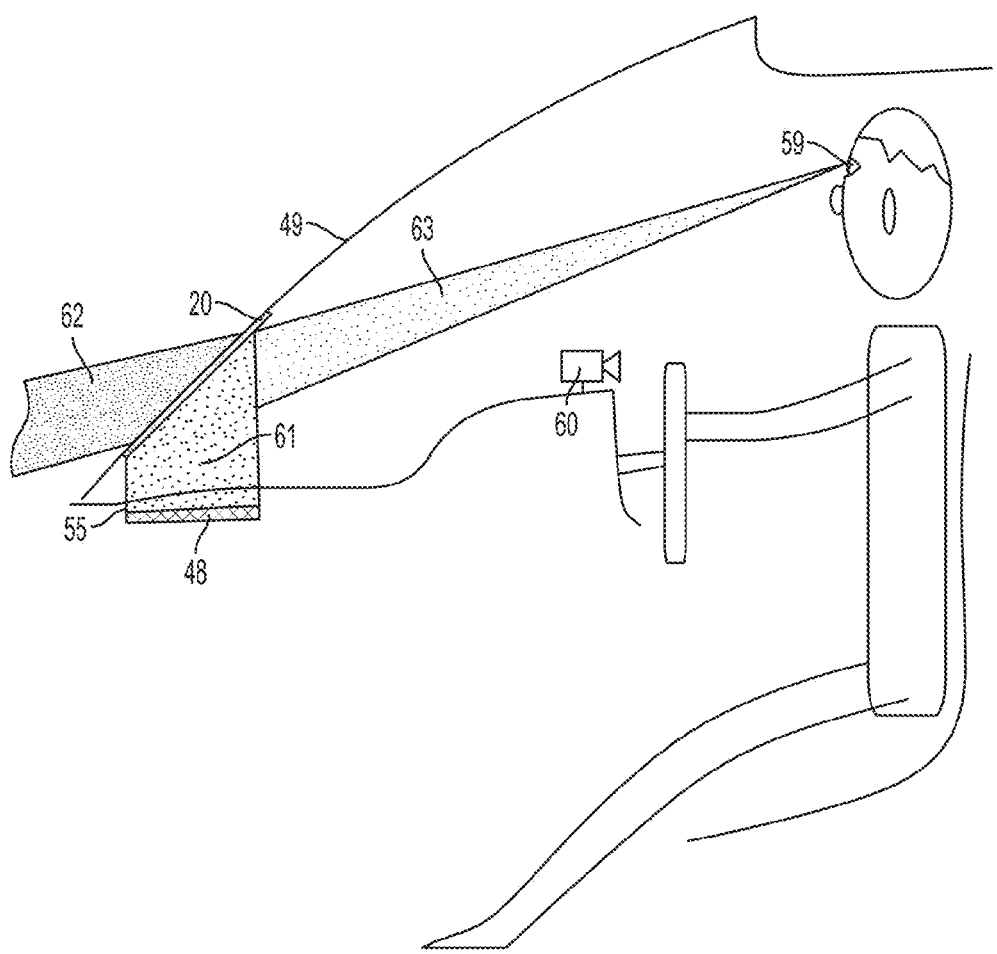
FIG. 7E is similar to FIG. 7B, with the difference that a LED display is used instead of a TFT display.
Figure 8A:
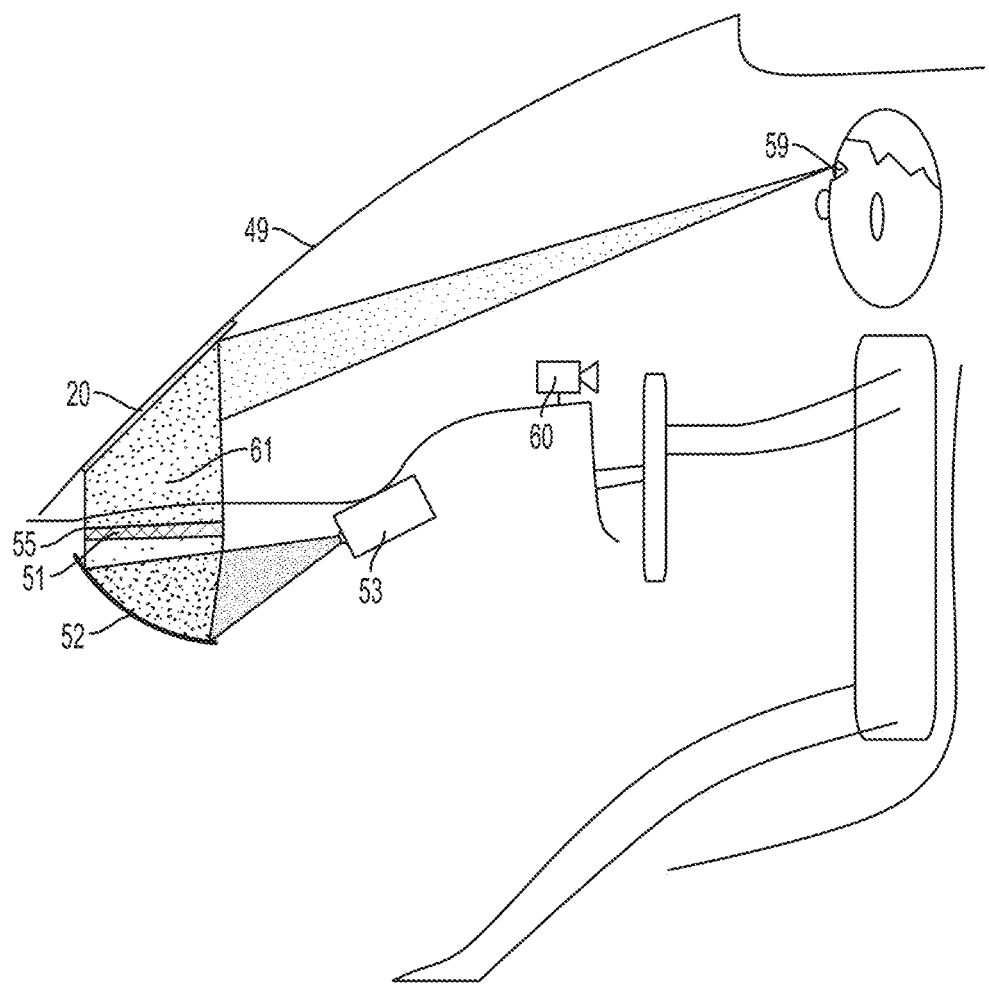
FIG. 8A is a side elevation and schematic showing another windshield head up display of the present invention using a projector as a light source, with the display turned on and the optional darkening foil 20 tuned to dark (rearward vision augmentation)
Figure 8B:
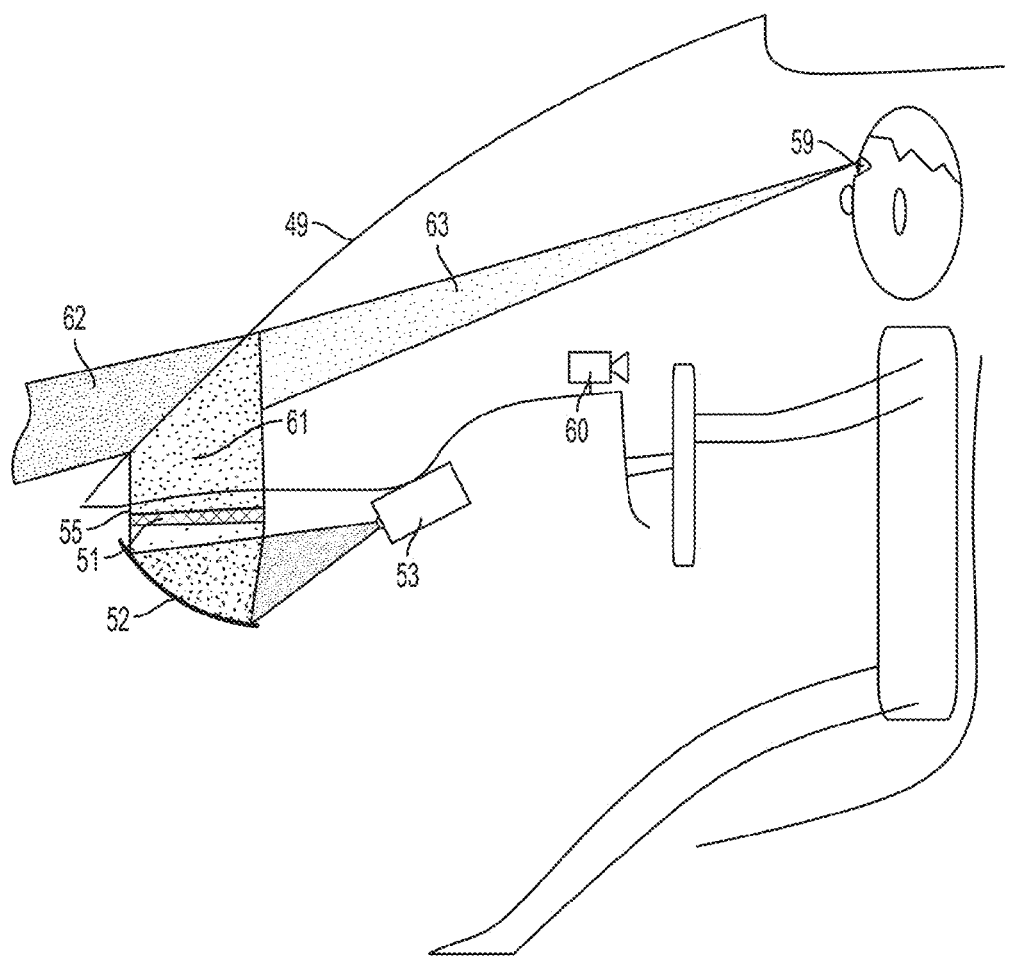
FIG. 8B side elevation and schematic showing another windshield head up display of the present invention using a projector as a light source, with the display turned on and the optional darkening foil 20 tuned to translucent (forward vision augmentation)
Figure 8C:
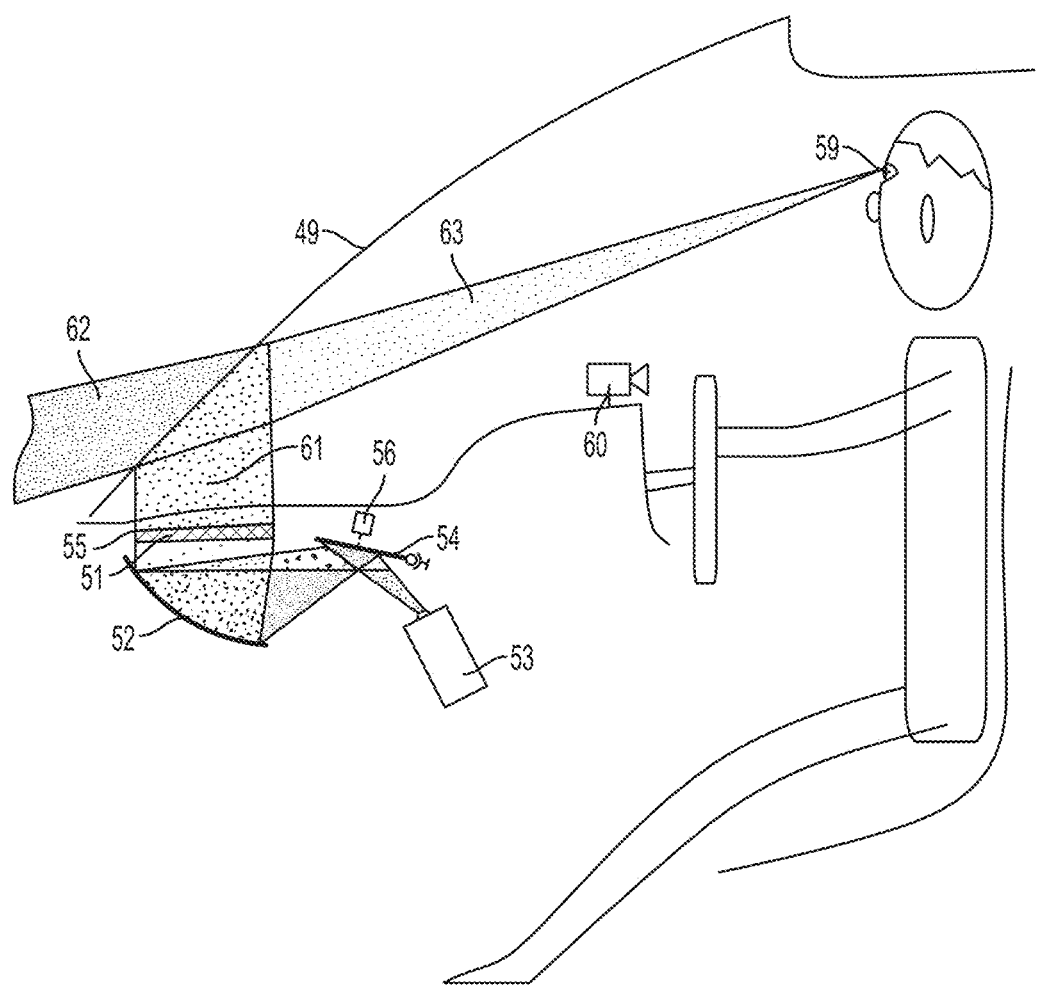
FIG. 8C is a side elevation and schematic showing another windshield head up display of the present invention using a projector as a light source having a turnable mirror and mirror actuator for altering the light beam path for tracking the head box according the driver's head, as detected by an in cabin camera.

When the blackening foil 20 is tuned to be translucent or non-darkened or non-opaque and the head up TFT display 47 (or optionally an LED display such as shown in FIG. 7E) is turned on, the projected (augmented) image light beam can be used as 2D or 3D forward view augmentation such as to be seen in FIGS. 6B and 7B. In forward vision it is known to project navigation system arrows, lane guidance indicators, vehicle instruments or indicators such as speedometer or blinker, object overlays of collision warnings, night vision enhancement, recognized traffic signs, status of an attached telephone or smart phone application content (see FIG. 6B).

In both cases, when either displaying a forward vision augmentation or rear vision, the use of the light field display allows the system to generate an artificially enlarged virtual focal point with a focal plane 87 virtually in a further distance than the optically system's optical path such as shown in FIG. 7D. By that, elderly people suffering under presbyopia are enabled to see the display content sharply without wearing glasses for compensating the view. For example, the micro lenses of the micro lens array may have respective focal points in the image plane of the display. For example, the micro lenses of the micro lens array may have focal lengths between about 1 mm and about 3 mm.

In the publication "Eyeglasses-free Display: Towards Correcting Visual Aberrations with Computational Light Field Displays", the author, Fu-Chung Huang, describes his studies about the light field monitors. Typically, the light field display needs a rather high display resolution. Each micro lens matches to a considerable number of display pixels. A reduction of the relative size of the micro lenses compared to the pixel size is possible without losing the performance of the system. So it is possible to keep the display resolution at a moderate value. As discussed above, when using a display with small, fast switchable pixels, such as a LED (or OLED), the resolution can be replaced or improved when vibrating the display in a defined x-y direction, switching the pixels on desired interpixel positions. A head tracking system is considered as necessary in order to create an acceptable eye box size for the observer. Though when accepting lower resolution while using larger micro lenses which cover more pixels, the viewer's head box will grow, so that no head tracking systems will be necessary.

A head and/or eye tracking systems may be provided in the automotive vision system, such as by utilizing aspects of the systems described in U.S. Publication No. US-2015-0296135, which is hereby incorporated herein by reference in its entirety. The system may track the driver's head. Optionally, the same or more displays may follow its focus to other passenger's heads. Optionally, the acoustics virtual source may also be controlled to follow simultaneously with the image presented by the individual light field monitor to the individual passenger such as by utilizing aspects of the systems described in U.S. patent application Ser. No. 14/807,011, filed Jul. 23, 2015, now U.S. Pat. No. 9,800,983, which is hereby incorporated herein by reference in its entirety.

The light field display can be built rather flat or substantially flat. Compared to a typical thin film transistor (TFT) monitor and LED displays, only the micro lens array is added which doesn't need much additional depth. The area dimension can be held similar to the TFT monitor or LED display.

The present invention may use mathematical methods for light field generation not only at TFT monitors or at LED or OLED monitors, but also optionally on TFT projectors, LED or OLED projectors or LASER projectors (referred to herein as projector or projection unit 53, such as shown in FIGS. 4A, 4B, 5A, 5B, 8A-C and 9A) projecting on a diffusor 51 optionally via some mirrors 52 and lenses. Because the physical image arises at the diffusor, the micro lens array 55 or pin hole dotted foil is disposed or placed in front of that diffusor into the line of sight to the viewer. The optical beam may pass the lens array only once and because of that, transmissive diffusors (not reflective diffusors) may find use, such as can be seen with reference to FIG. 4A. The projector's resolution may be in a range to project equal or more than 3×3 pixel below each micro lens or pin hole accordingly.

In U.S. Pat. No. 7,855,755, an interior mirror is described containing a display portion capable of displaying the image of a rearview vehicle camera. Younger people are able to the see monitor image sharply, individuals suffering under presbyopia, such as older people over around 50 years old, may have problems to conceive the image displayed at the rearview mirror sharply since the rearview mirror is installed comparably close (such as about 40 cm or thereabouts) to the driver's typical head position. Using a light field monitor system, such as shown in FIG. 10A, in accordance with the present invention may ease or overcome this disadvantage.

Nissan advertise a "smart rearview mirror" such as first shown in its ZEOD car and announced at http://www.nissan-global.com/EN/NEWS/2014/_STORY/140228-01-e.html in Feb. 28, 2014. The driver can use it as an interior rearview mirror matching also legal requirements. In case of blocking the rearview with luggage, the driver can switch the mirror to be translucent or light transmissive (or the mirror reflective element may comprise a partially reflective and partially light transmissive reflector such that the monitor may be viewable through the mirror reflector when the monitor is activated and may not be viewable through the mirror reflector when deactivated) and switch on a monitor behind the mirror reflective element. Also, with this application presbyopia is an issue. Besides using a typical head-up display with the disadvantage of having a huge packaging space, this problem can be overcome with the usage of a light field display in accordance with the present invention.

It is expected that the upcoming legal requirements (derived from ISO 16505) of rearview mirror camera systems will demand a certain minimal size of the real or virtual image. Therefore, the typical head-up-display optic will get a critical height dimension or size, especially when placing the display into a typical rearview mirror region (upper center of the windshield). Compared to typical head up displays (see FIG. 4A) a light field monitor similar to that shown in FIG. 10A is more compact and can be integrated more easily into a vehicle. Due to the light field display being capable to virtually generate correct parallax scrolling in combination of a head-/eye-tracker, the inner rearview light field display will behave close to what drivers are used to seeing at real mirrors nowadays.

Figure 10A:
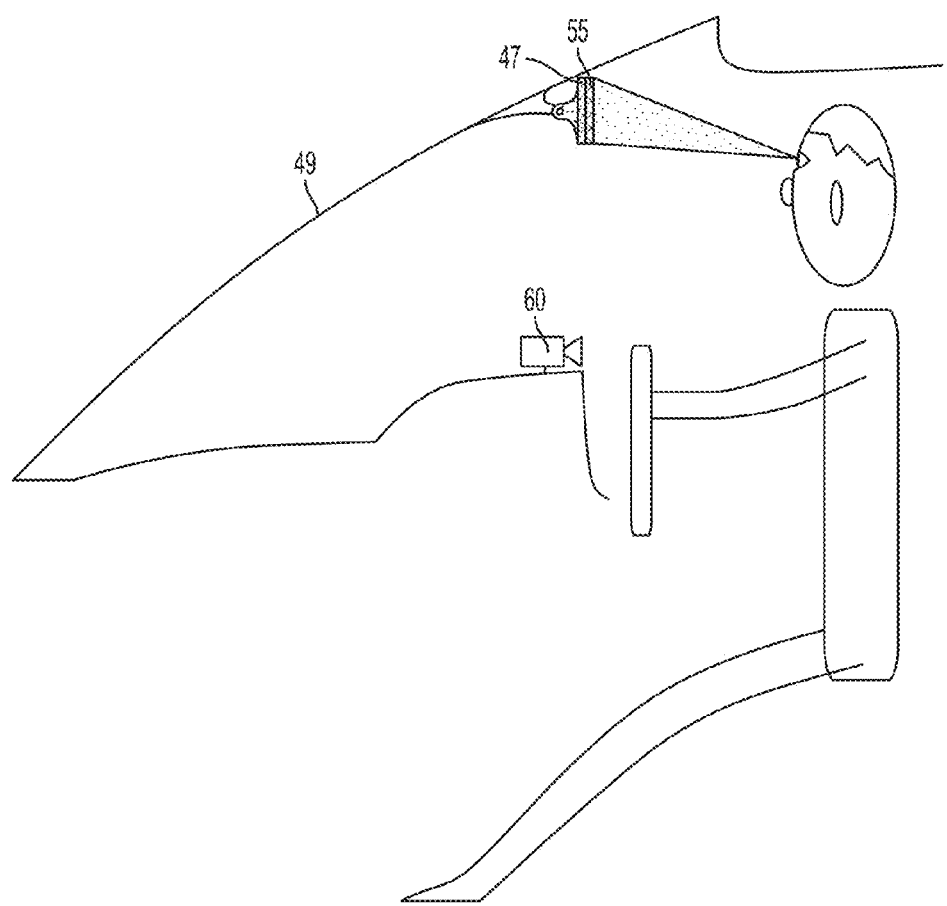
FIG. 10A is a side elevation and schematic showing an interior (central) rearview mirror display of the present invention.
Figure 12:
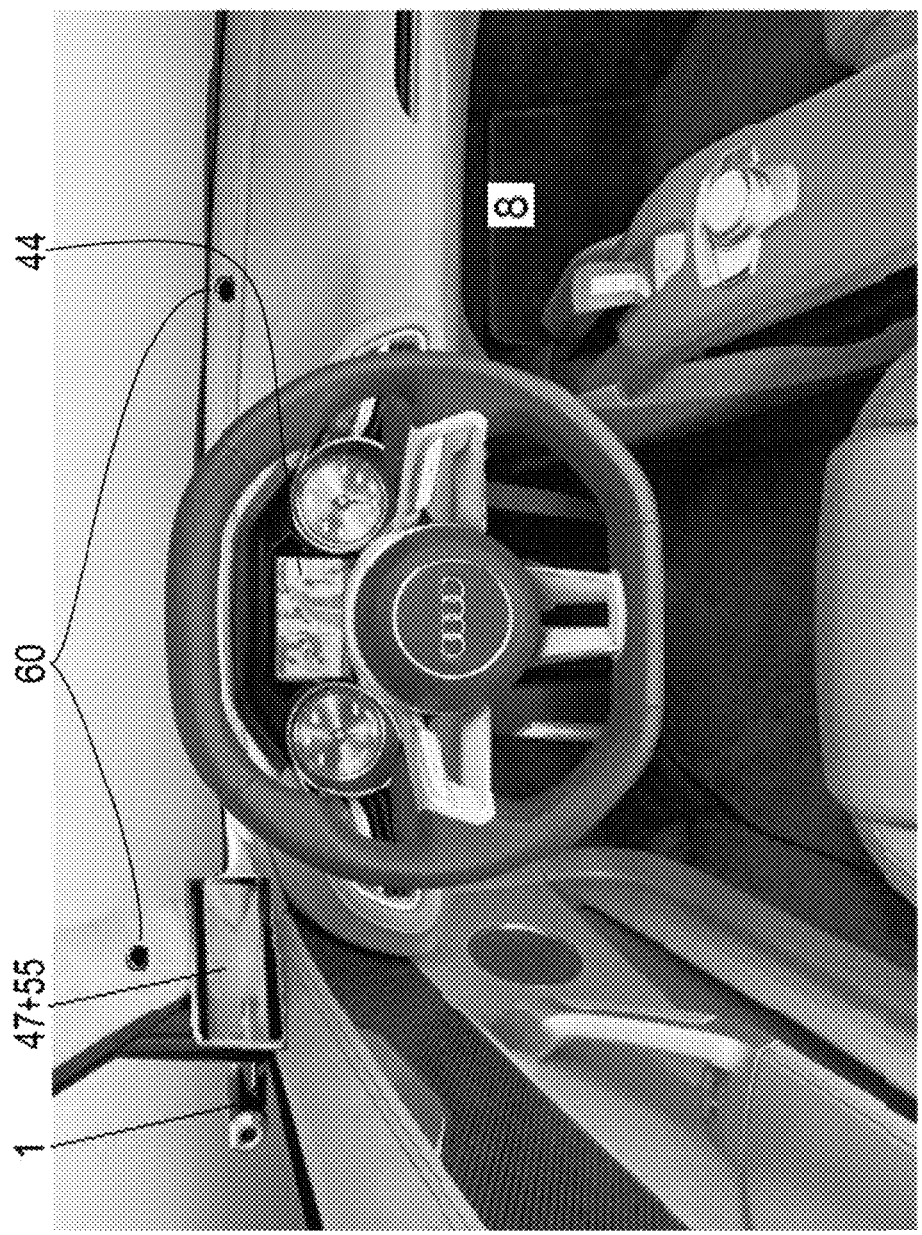
FIG. 12 shows a vehicle cabin light field display at the A-pillar, showing the left side rear view captured by the side rearview camera 1, and with two eye/head tracking cameras 60 for tracking eye movement of the driver of the vehicle in accordance with the present invention.

Optionally, near the left and the right A column, light field monitors similar to that shown in FIG. 10A may be mounted which replace the exterior rear view mirrors with a camera-monitor system each, see FIG. 12.

A further advanced system according to the present invention may have one two dimensional (2D) movable mirror element or two consecutive crosswise one dimensional (1D) movable mirror elements for altering the beam path of the light field. Alternatively, a DLP may be used instead.

It is known to adjust the beam path of conventional head up displays according to the vehicle's seat adjustment. According to the present invention, the beam path may be adjusted by following the actual head position to keep the driver's head, especially the eyes, in the head box (see FIG. 5A-D). The adjustment may be controlled by the position detected by the head/eye tracker (such as determined by image processing of image data captured by a cabin monitoring camera). That may allow the driver to lean from side to side and bend forward and backward on the driver seat. The extent of bending may possibly be limited by the optical bench's possible beam path or the turnable mirror's turning ability. Alternatively, the adjustment may be done purely mathematically by writing adequate substructure image information into the light field display. The mechanical adjustment elements then can be omitted. Optionally, both methods may be done in combination. Optionally, the head adjustment may be combined with methods for interpixel interpolation using adjustable mirror elements, as discussed above.

The head tracking system's cameras 60 may be placed anywhere in the cabin. Cameras installed at the dashboard are shown in FIGS. 6A, 6B, 7A-E, 8A-C, 9A, 9B, 10A, 10B, 11A, 11B, 12 and 13. The light field may be tuned individually to the driver's viewing distance (also given by the head tracker's position) and the driver's eye disability correction and/or presbyopia.

Optionally, 3D images may be screened on the light field displays possibly paired with the ability to cope viewers viewing disabilities. For generating a true 3D image for a viewer's eye pair, a disparity image has to be generated for each eye individually. Assuming the head and eye tracker's accuracy is sufficient to distinguish the viewing angle of the viewer's right eye from the viewing angle of the left eye, the light field can generate an image for each eye individually. The method to generate such a 3D view generation may utilize aspects of the systems described in International Publication Nos. WO 1998/034411 and/or WO 2001/088598, which are hereby incorporated herein by reference in their entireties. The directional viewing split may be done substantially at an angle of the spot in the middle of both eyes to the display plane.

More advanced to known light field projection units may come into use for use in vehicle cabin. Examples of such systems are shown in FIGS. 8A-C and 9A-C. Optionally, these systems may display in 3D. The light field head up displays shown in FIGS. 7A-E optionally display in 2D or 3D. The produced view may come close to the stitched rearview image shown in a vehicle cabin windshield as shown in FIG. 6A. In this example, the head up display displays a seamless side-rear view panorama image 45 that may be generated (in real time) by morphing and stitching images (41, 42, 43) from the vehicle side and rear cameras by combining and utilizing aspects of the systems described in U.S. Publication No. US-2015-0232030 and U.S. patent application Ser. No. 14/852,950, filed Sep. 14, 2015, which published on Feb. 11, 2016, as U.S. Patent Publication No. US-2016-0044284, which are hereby incorporated herein by reference in their entireties. This will allow the system to display or project video images of the vehicle's rear and/or side region (blind spot) onto the vehicle's windshield or onto a combiner at the top or bottom region in real 3D without requiring that the viewer wear glasses. As discussed above, this works when the optical path passes the lens array only once. The projected image may be movable by mechanical means 54 or virtually by mathematically tuning the light field display as discussed above. Any virtual rearview image may be controlled to generate a virtual parallax scrolling impression (such as by utilizing aspects of the systems described in U.S. Publication No. US-2015-0232030, incorporated above). This may be done in a way as when looking in a physical mirror or in an extended way so that the scrolling is stronger compared to a real mirror.

FIGS. 14A-D visualize this effect: similar as when looking into a mirror, the mirror's frame, so the edge borderlines of the physical display (TFT 47 or LED 48 plus lens array 55), appear as being a fixed frame. When the viewer is moving his or her head, which is detected by the head tracker, the image is controlled such that the image may scroll into the counter direction. By that more of the image's bottom end 93 may scroll into view while losing image content of the top end 92, when the user moves the head (and with the head the eyes) upwardly (In example of FIG. 12, from position 90 to 91). From position A (90), the viewer sees the image 88, while from position B (91), the viewer sees the image 89.

Figure 15A:
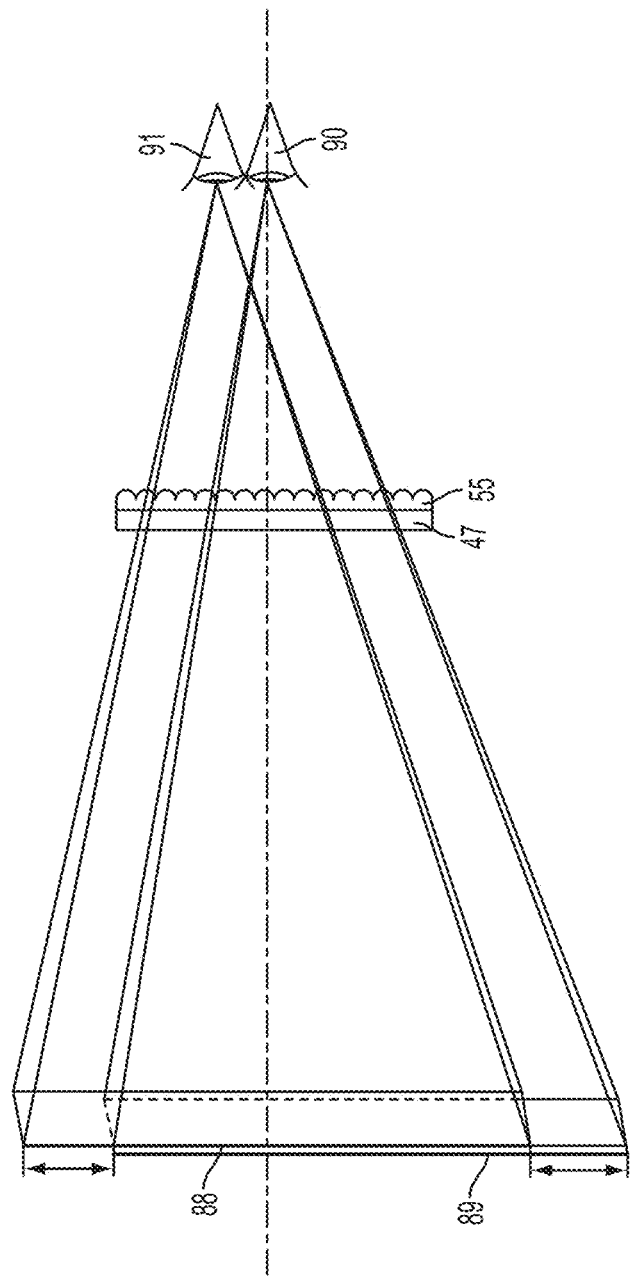
FIG. 15A shows a virtual image generated as being linked to the observer's eye position, where virtual objects shift as much (88 to 89) as (or in accordance with) the viewer's eye shifts (90 to 91)
Figure 15B:
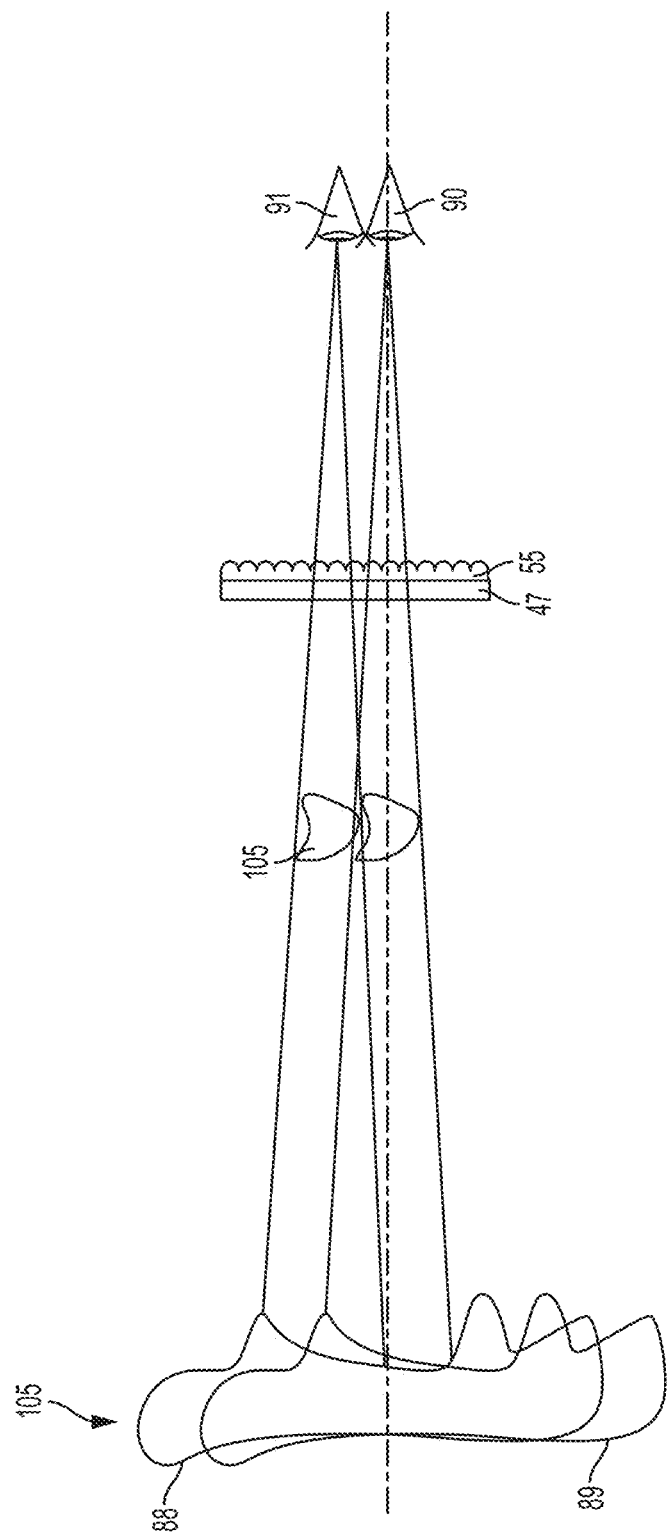
FIG. 15B shows a virtual image similar to FIG. 15A, where the virtual image is generated in a way as when being linked to the observer's eye position, wherein virtual objects shift as much (88 to 89) as (or in accordance with) the viewer's eye shifts (90 to 91), and where objects and surfaces in the background hidden or occluded by objects in the foreground stay hidden or occluded in the same way since all objects shift simultaneously as much as the observer's view shifts.

As discussed above as an alternative option of view generation to the viewer is to have the virtual image set to a fixed position such as shown in FIGS. 15A and 15B. The viewer sees the same virtual image from different eye positions.

Figure 10B:
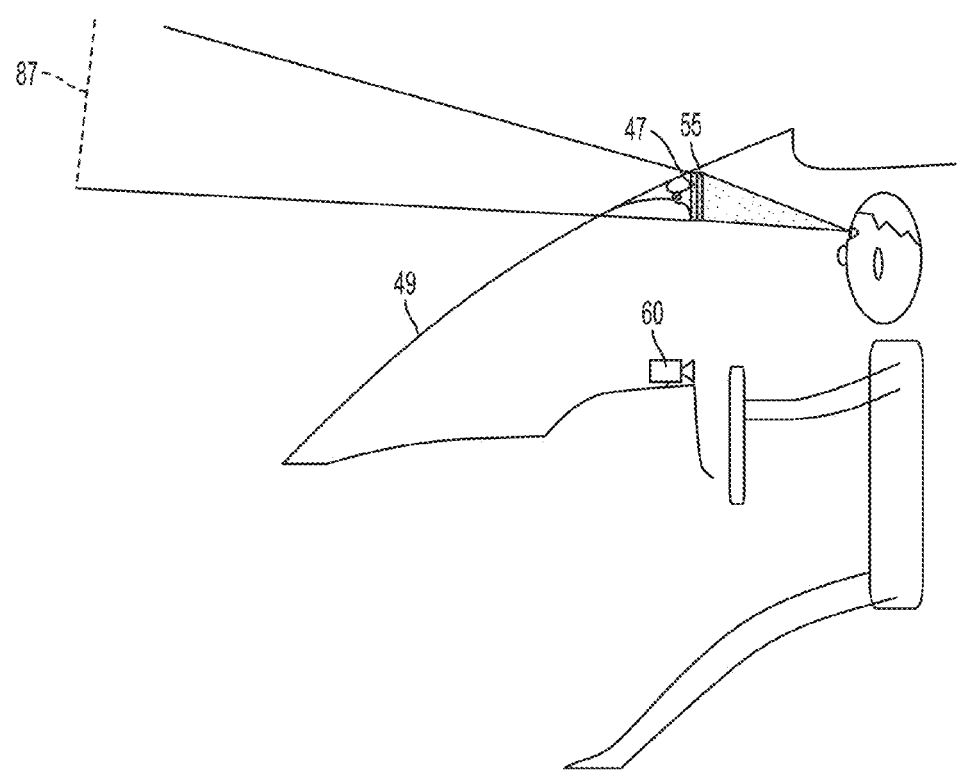
FIG. 10B shows the light field display assembly of FIG. 10A, and additionally showing the virtual image plane.

Optionally, head box adjustments may be done by an optional turnable mirror. Especially when used in head up (light field) displays (FIG. 8C) or combiner head up (light field) displays (FIGS. 9A-C), the head box may be turned actively towards the viewer's head, as detected by the head tracker. Such a turnable mirror may be incorporated as part of the system of the present invention. As another aspect of the present invention, the vehicle rearview mirrors with integrated display or mirror replacement applications using camera and monitors for presenting rear and top view images may use light field monitors or light field projectors according to the present invention. Because the central rearview mirror is very close to the driver, that mirror's integrated monitor or replacement monitor may be difficult to conceive by drivers with presbyopia. This difficulty will be reduced by using light field monitors or projectors. An example of such an application is shown in FIG. 10A. The virtual focal plane may be outside the vehicle such as shown in FIG. 10B. Another example is shown in FIG. 12, where the left outside rearview mirror is replaced by a camera viewing rearward of the vehicle and having a display in the A-pillar region displaying essentially the images taken by the rearward viewing camera, which may be image computed additionally. In this example, the display 47 has a lens array 55 on top which makes it a light field array of the present invention. FIG. 13 shows an on top center dashboard realization of an in vehicle wide screen light field display in accordance with the present invention.

Figure 11A:
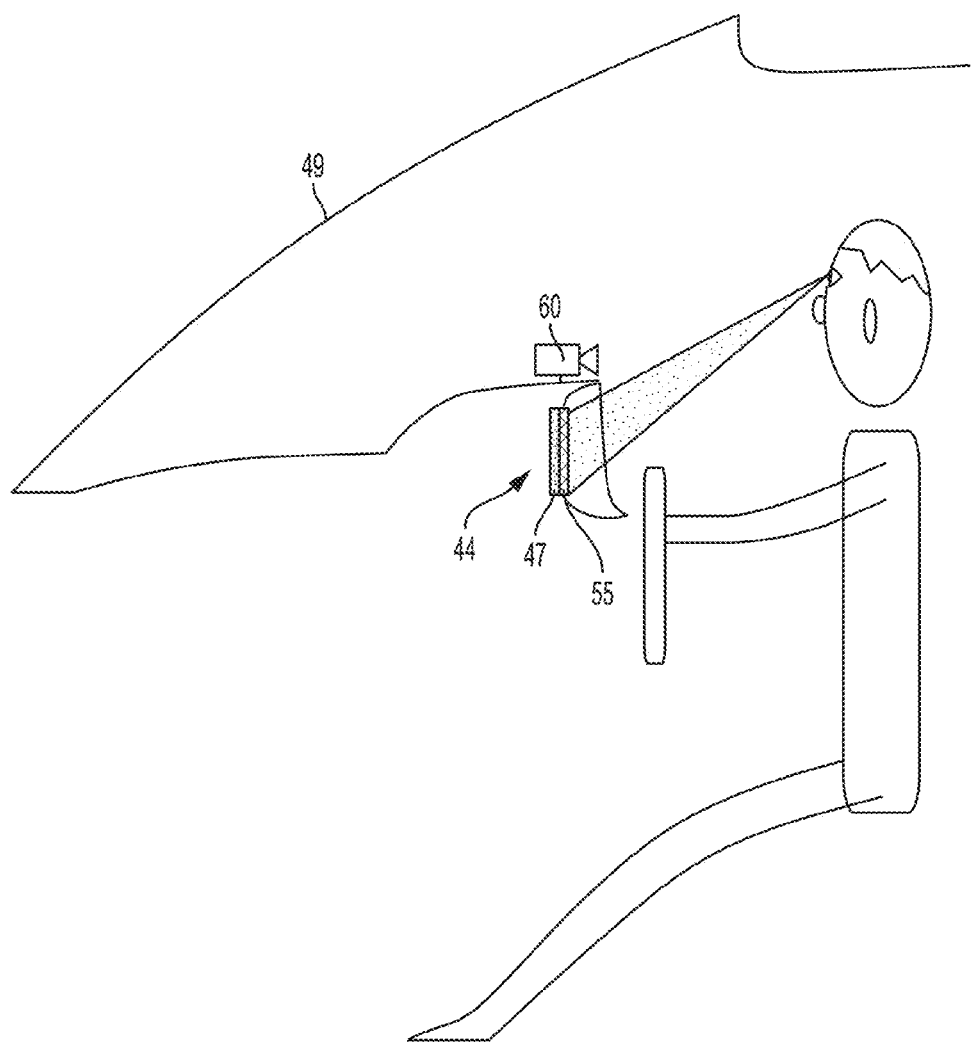
FIG. 11A is a side elevation and schematic showing a dashboard light field display and an in-cabin camera of a head tracking system of the present invention.
Figure 11B:
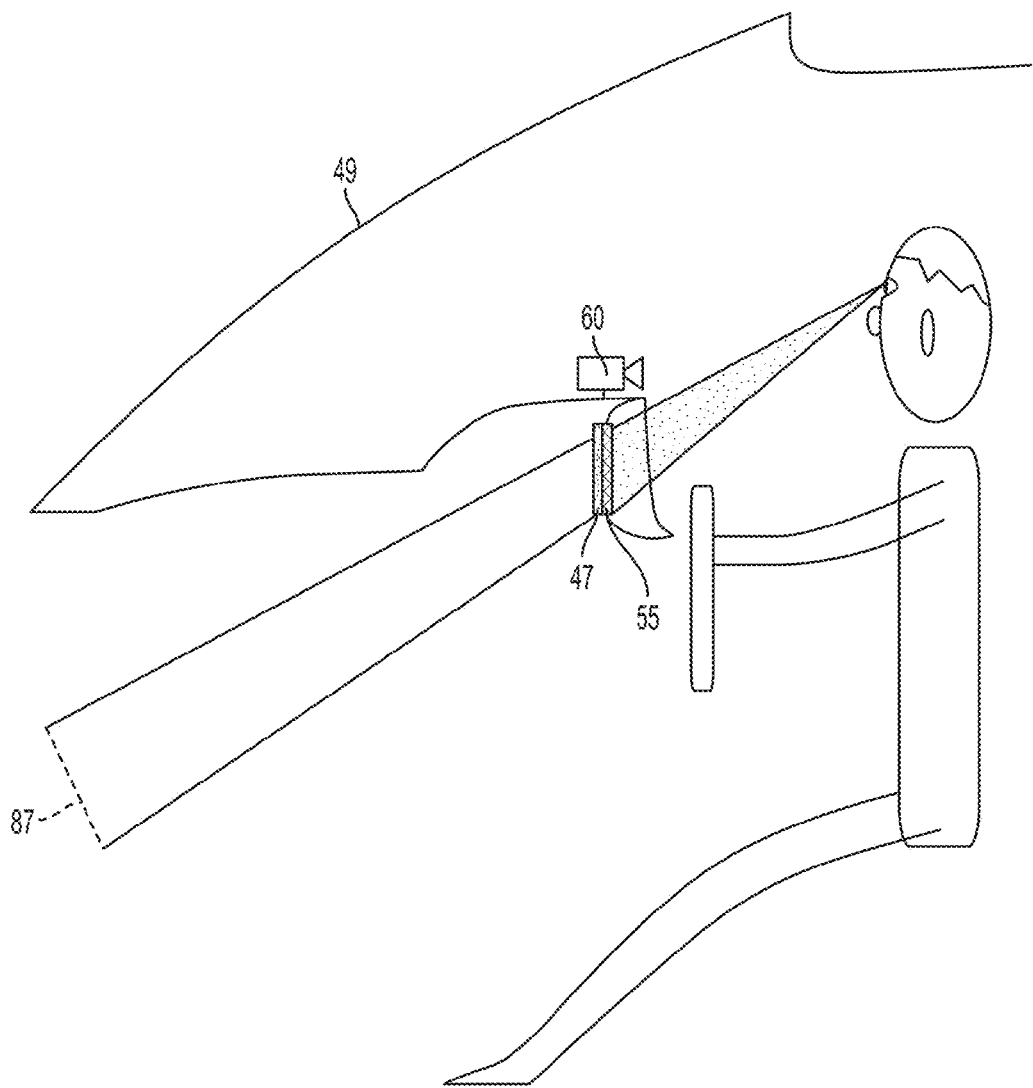
FIG. 11B shows the dashboard light field display assembly of FIG. 11A, and additionally shows the virtual image plane.

Other display applications may also benefit from using light field displays of the present invention. For example, because the instrument cluster display is very close to the driver, that monitor is difficult to conceive by drivers with presbyopia. Also, healthy drivers' eyes tend to tire more rapid, when they have to adapt their eye focus from the outside scene to the close cluster instruments and back, especially at night or low ambient lighting conditions. This difficulty will be reduced by using light field monitors by tuning the focal distance farther than the monitor distance, such as shown in FIGS. 11A and 11B. Because the light field monitor is 3D capable, the cluster display content may be arranged with the depths of the virtual room. Puredepths® showed a virtual 3D cluster display application using a two layer TFT-monitor. That made visual emulation of a pointer instrument possible and the pointer seems to appear above the dial and having real parallax without the need of wearing 3D-goggles. The depths of that monitor are limited. A light field monitor of the present invention will be able to have unlimited depths instead.

Optionally, the most recent or most important icons, table, figures, gauges may be arranged in the foreground while less recent or less important information is shown in the background. Optionally, the chosen colors of icons, tables, figures, gauges may be chosen in colder colors (shorter wavelengths) instead of warm colors, since humans see colder colors more sharply than warmer colors because of the dispersion of the human eye. Optionally, that function may be switched corresponding or depending on the ambient light, headlamp control, driver's age and/or a drowsiness surveillance system. Optionally, vehicle systems' light field monitors or projectors may have larger lenses covering more pixels and having no need for a head tracker, when displaying more rough data such as for displaying navigation arrows, digits or icons.

Possible applications with conventional head up displays and combiner head ups are known. 3D-vision in a vehicle instrument display is described in GB2517793 using autostereoscopic displays, without mentioning how these function. As discussed above, in forward vision it is known to project navigation system data, maps, arrows, lane guidance indicators, vehicle instruments or indicators such as speedometer, RPM or blinker, ADA system object overlays of collision warnings, night vision enhancement, recognized traffic signs, status of an attached telephone or smart phone application content. Since the used space, especially the (real) depths of a head up display is low (according the system shown in FIGS. 7A-C) a wide screen, especially full windshield widths in accordance with the example of FIGS. 6A and 6B becomes achievable. By the usage of wide screen head up displays some applications envisioned by OEMs now become possible, such as JLR's "Transparent Hood," from Apr. 8, 2014 disclosed in http://newsroom.jaguarlandrover.com/en-in/land-rover/news/2014/04/lr_dvc_tease_technology_090414/, or such as JLR's "Follow me Ghost Car" disclosed in http://newsroom.jaguarlandrover.com/en-in/jlr-corp/news/2014/12/jlr_virtual_urban_windscreen_151212/ at Dec. 15, 2014. Both publications are computer animated and not realized in real working models. Due to a wide screen forward vision augmentation more, so far unknown applications, may become possible: for common drivers but especially for delivery services, postal service, taxi drivers or pick up services the navigation system typically tells the street and housing's number when arrived. Sometimes a location is still hard to find since an entrance is in a back house or the specific entrance is between several other entrances. The windshield screen may highlight, encircle or point by an arrow to the specific address number and address entrance that the driver is looking for. Optionally, the system may point into a gap at the display showing where to enter when a door is occluded or hidden. Optionally, especially for pick up or delivery services, the delivery point may not be a door but a ramp, drop box, drop door or just a spot which may be set individually by the to be delivered or picked up person or company. Optionally, a person may indicate he or she is sitting inside until a called taxi arrives at a certain spot set by the customer who is going to walk to that spot at the moment the taxi arrives. The spot may be indicated by augmentations in the front windshield full screen.

Optionally, the wide front windshield screen may show a separate image content towards the driver and passenger either by just splitting the view in half or by having both image content blended by the display device in one way that content is visible in the direction of the passenger's head and another way that content is visible in the direction of the driver's head.

Figure 16:
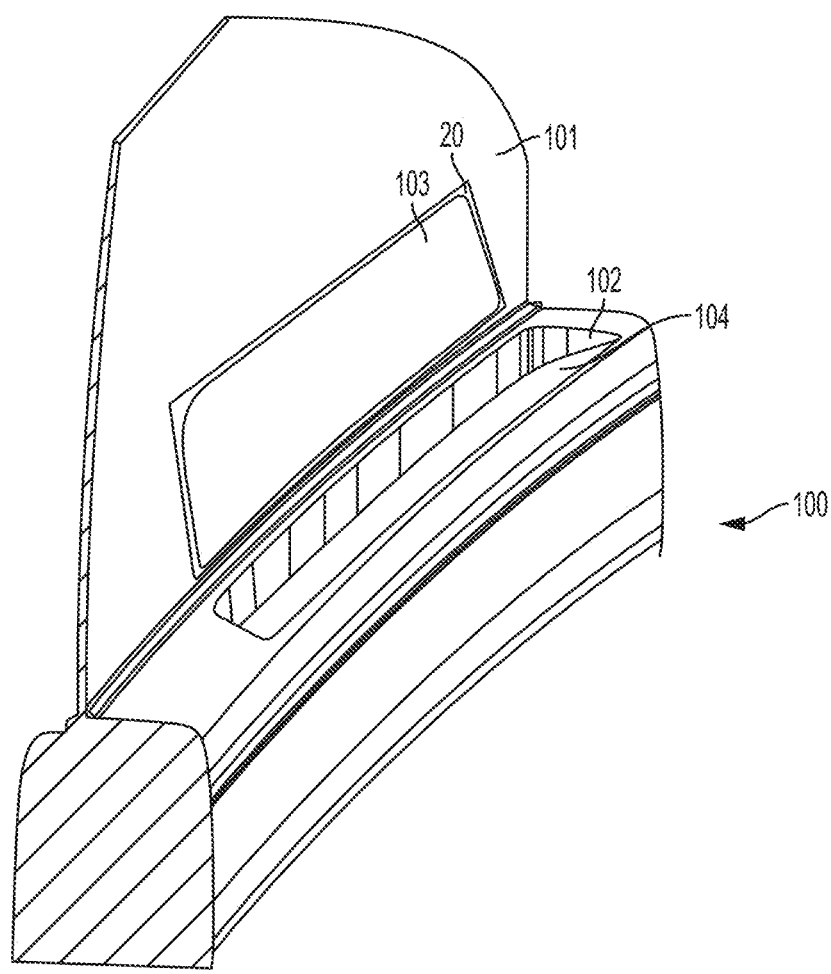
FIG. 16 shows the cross cut to a vehicle side door head up light field display in accordance with the present invention, which is embedded to the windows still in a furrow for being tilted toward the window to make the image viewable to the driver in the window's reflection.
Figure 17:
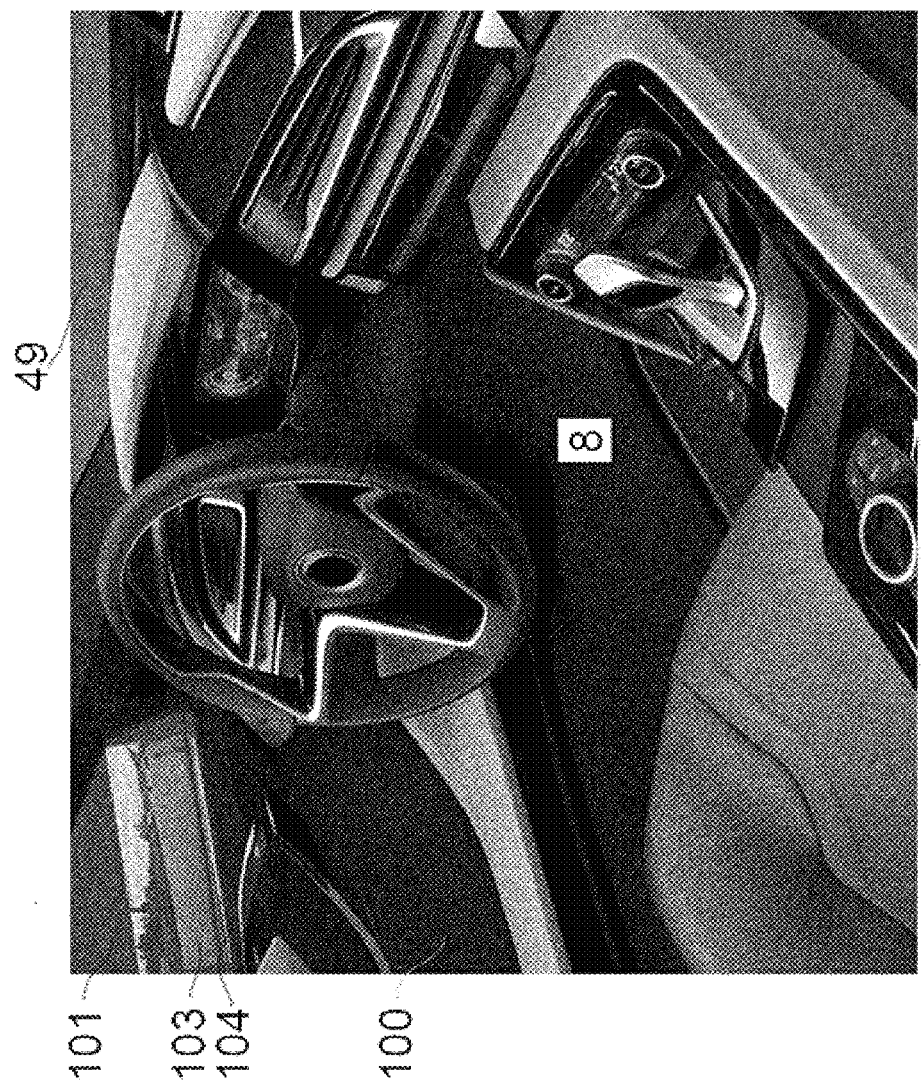
FIG. 17 shows a vehicle cabin view with the vehicle side door head up display of FIG. 16 active and with the image reflected on the side window and visible to the driver, and showing a rearwardly directed side camera's combined rear and blind spot image as a replacement for a conventional side mirror.

As another option, the 3D head up displays with optional eye defect compensation according to the present invention may also find use in displaying and augmenting vision in the vehicle side windows (see FIGS. 16 and 17). Since the side door 100 window still is comparably short, just a small display 104 may come into use that image is being reflected 103 in the side window 101. The display may sit in a small furrow 102 for being tilted toward the window. Optionally, a darkening foil 20 and/or optionally an opaquening (or whitening) foil may find use at the side window to improve the display's image visibility by enhancing the contrast or by reducing the light from outside. Any information or image may be displayed. Optionally, a side camera's combined rear and blind spot view, such as by utilizing aspects of the systems described in the above incorporated International Publication No. WO 2014/204794, may be displayed such as shown in the example of FIG. 17 of this application. Image overlays and augmentations, such as those shown in International Publication No. WO 2014/204794, especially 3D overlays and augmentations, such as those shown in that international publication, may be realized under use of the side window head up display of the present invention.

Optionally, such as at times where the systems are made for displaying more detailed, high resolution content, such as when displaying the image content of a megapixel camera (or optionally with higher resolution), the system may employ smaller lenses covering less pixels and possibly employ a head tracker and optionally employ a control for controlling a movable mirror to track the head up light field projector system's eye box to the driver's head.

As discussed above with reference to FIGS. 6A and 6B, the head up display of the present invention may display a seamless side-rear view panorama image 45 generated (in real time) by morphing and stitching images 41, 42 from the vehicle side cameras and images 43 from the vehicle rear camera, or may display a top down surround view by stitching images from vehicle side, rear and front cameras. In such an application, the system may include an image processor that processes image data captured by the camera or cameras, and that may provide display of images and/or object detection of objects present in the field of view of one or more of the cameras.

FIG. 12 shows a light field monitor 47+55 which is used together with a camera 1 as a replacement of the driver side mirror.

TABLE 1

| Pixels below each Micro Lens | Needed Resolution of the basic monitor | Eye Box | Head tracking |
|---|---|---|---|
| 3 × 3 | moderate | Small | Needed |
| 4 × 4 | Slightly higher | Slightly bigger | desirable |
| 5 × 5 | High | Big | Probably not needed |
| More than 5 × 5 | Very high | Very big | Probably not needed |

In Tables 2-5, solutions are described using 3×3 sub pixels below each micro lens.

In order to increase the eye box head tracking is strongly desirable.

This light field monitor may be built with properties in accordance with Table 2:

TABLE 2

| Basic Monitor | Such as similar to a small tablet device |
|---|---|
| Image Size | 159 mm × 120 mm |
| Resolution | 2048 × 1536 |
| Number of Micro Lenses | 682 × 512 |
| Pixels below each micro lens | 3 × 3 |
| Focal Length of the micro lenses | 1.73 mm |

FIG. 10A shows a light field monitor 47+55, which is used within the interior rearview mirror. This light field monitor may be built with properties in accordance with Table 3:

TABLE 3

| Basic Monitor | Similar smart phone display |
|---|---|
| Image Size | 104 mm × 58.4 mm |
| Resolution | 1334 × 750 |
| Number of Micro Lenses | 444 × 250 |
| Pixels below each micro lens | 3 × 3 |
| Focal Length of the micro lenses | 1.73 mm |

FIG. 4C shows a light field monitor 47+55, which is a head-up display with additional 3D capability. This light field monitor may be built with properties in accordance with Table 4:

TABLE 4

| Basic Monitor | Available 3 Inch TFT display |
|---|---|
| TFT Image Size | 63.4 mm × 42.3 mm |
| TFT Resolution | 720 × 480 |
| Number of Micro Lenses | 240 × 160 |
| Pixels below each micro lens | 3 × 3 |
| Focal Length of the micro lenses | 1.96 mm |

FIG. 7A shows a light field monitor 47+55, which is seen via a reflection of the windshield. Alternatively, it may also to arranged to the direct view of the human driver. This light field monitor may be used to overcome the presbyopia effect and/or to show a 3D image. This light field monitor may be built with properties in accordance with Table 5:

TABLE 5

| Basic Monitor | Available 3 Inch TFT display |
|---|---|
| TFT Image Size | 63.4 mm × 42.3 mm |
| TFT Resolution | 720 × 480 |
| Number of Micro Lenses | 240 × 160 |
| Pixels below each micro lens | 3 × 3 |
| Focal Length of the micro lenses | 1.96 mm |

In the following tables, solutions are described using 5×5 sub pixels below each micro lens. A head tracking system may be omitted:

TABLE 6

| Basic Monitor | Such as similar to a small tablet device |
|---|---|
| Image Size | 159 mm × 120 mm |
| Resolution | 2048 × 1536 |
| Number of Micro Lenses | 410 × 370 |
| Pixels below each micro lens | 5 × 5 |
| Focal Length of the micro lenses | 2.6 mm |

TABLE 7

| Basic Monitor | Such as similar to a small tablet device |
|---|---|
| Image Size | 111 mm × 62 mm |
| Resolution | 1920 × 1080 |
| Number of Micro Lenses | 384 × 216 |
| Pixels below each micro lens | 5 × 5 |
| Focal Length of the micro lenses | 1.93 mm |

TABLE 8

| Basic Monitor | Such as similar to a small tablet device |
|---|---|
| Image Size | 143 mm × 80 mm |

TABLE 8-continued

| | |
|---|---|
| Resolution | 1920 × 1080 |
| Number of Micro Lenses | 384 × 216 |
| Pixels below each micro lens | 5 × 5 |
| Focal Length of the micro lenses | 2.5 mm |

Optionally, vision system and light field display of the present invention may comprise an infotainment system having the light field display disposed at or in the instrument panel of a vehicle (such as for viewing by a passenger of the vehicle sitting in the front passenger seat of the vehicle) and/or at or in the back of a front seat head rest of a vehicle (such as for viewing by a passenger of the vehicle sitting in a rear seat of the vehicle). The light field display may be operable to display movies or vehicle information or telematics system information or the like, such as responsive to one or more user inputs, whereby the passenger of the vehicle may control the display and view the displayed images, while not interfering with the driver of the vehicle.

The light field display of the present invention is disposed in a vehicle and can correct or adapt the displayed images for eye defects of the viewer by slightly editing the display content. The light field display system of the present invention assumes that the viewer is far sighted, such that the image is reassembled in a further focus depth than as a normal display would be shown. This allows the display to be used as a head up display which should appear at least about 1.5 m and preferably about 2 m distance from the driver, while the actual optical path is shorter, such as, for example, about 50 cm (for a head up display) or about 35 cm (such as for a central rear view mirror display). Older or elderly people cannot accommodate or discern displays at close ranges of about 35 cm any more such that an inside mirror replacement display at a 35 cm distance is not desired unless the viewer or driver is wearing presbyopia sliding or progressive glasses. But for bifocal type glasses, the glasses must be upside down, since the image is in the top area.

For a head up display, 2 m and more is beneficial when doing forward viewing augmentation, and by that the user does not need to accommodate to the windshield plane and back to the outside scene when looking at the augmented speedometer or tachometer or the like. The present invention allows for augmenting a rearview panorama in 2D or optionally 3D and possibly with correct parallax scrolling (this works with a 3D capturing camera array, such as a panoptic or multi lens array or estimated artificially rendered depth). Additionally, the present invention may include head box tracking and adapting the displayed image for the determined location of the viewer's eyes. The system of the present invention is configured to be disposed within the cockpit or cabin of the vehicle. An additional benefit of the light field display of the present invention is that the volume or space that the head up display requires is much smaller than known displays (such as known displays requiring about 7 liters of space, while the light field display of the present invention may require only several cubic inches of space).

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in International Publication Nos. WO 2013/081984 and/or WO 2013/081985, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an EyeQ2 or EyeQ3 image processing chip available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ladar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. Preferably, the imaging array has at least 300,000 photosensor elements or pixels, more preferably at least 500,000 photosensor elements or pixels and more preferably at least 1 million photosensor elements or pixels. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 8,694,224; 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 6,882,287; 5,929,786 and/or 5,786,772, which are all hereby incorporated herein by reference in their entireties. The system may communicate with other communication systems via any suitable means, such as by utilizing aspects of the systems described in International Publication Nos. WO/2010/144900; WO 2013/043661 and/or WO 2013/081985, and/or U.S. Publication No. US-2012-0062743, which are hereby incorporated herein by reference in their entireties.

Optionally, the vision system (utilizing the forward facing camera and a rearward facing camera and other cameras disposed at the vehicle with exterior fields of view) may be part of or may provide a display of a top-down view or birds-eye view system of the vehicle or a surround view at the vehicle, such as by utilizing aspects of the vision systems described in International Publication Nos. WO 2010/

099416; WO 2011/028686; WO 2012/075250; WO 2013/019795; WO 2012/075250; WO 2012/145822; WO 2013/081985; WO 2013/086249 and/or WO 2013/109869, and/or U.S. Publication No. US-2012-0162427, which are hereby incorporated herein by reference in their entireties.

Optionally, the video display may utilize aspects of the display devices described in U.S. Pat. Nos. 5,530,240; 6,329,925; 7,855,755; 7,626,749; 7,581,859; 7,446,650; 7,370,983; 7,338,177; 7,274,501; 7,255,451; 7,195,381; 7,184,190; 5,668,663; 5,724,187 and/or 6,690,268, and/or in U.S. Publication Nos. US-2006-0061008 and/or US-2006-0050018, which are all hereby incorporated herein by reference in their entireties. The display may be disposed behind a mirror reflective element so as to be viewable through the reflective element when the display is activated to display information. The mirror assembly and/or display may utilize aspects described in U.S. Pat. Nos. 7,184,190; 7,255,451; 7,446,924 and/or 7,338,177, which are all hereby incorporated herein by reference in their entireties. The thicknesses and materials of the coatings on the substrates of the reflective element may be selected to provide a desired color or tint to the mirror reflective element, such as a blue colored reflector, such as is known in the art and such as described in U.S. Pat. Nos. 5,910,854; 6,420,036 and/or 7,274,501, which are hereby incorporated herein by reference in their entireties.

Optionally, the display or displays and any associated user inputs may be associated with various accessories or systems, such as, for example, a tire pressure monitoring system or a passenger air bag status or a garage door opening system or a telematics system or any other accessory or system of the mirror assembly or of the vehicle or of an accessory module or console of the vehicle, such as an accessory module or console of the types described in U.S. Pat. Nos. 7,289,037; 6,877,888; 6,824,281; 6,690,268; 6,672,744; 6,386,742 and/or 6,124,886, and/or U.S. Publication No. US-2006-0050018, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vision system of a vehicle, said vision system comprising:
a camera configured to be disposed at the equipped vehicle so as to have a field of view exterior of the equipped vehicle;
a display configured to be disposed in a vehicle equipped with said vision system so as to be operable to display images for viewing by an occupant of the equipped vehicle;
wherein said display comprises a light field display;
wherein said light field display comprises an imaging display screen and a micro lens array disposed at said imaging display screen, said imaging display screen comprising a plurality of display pixels;
wherein said imaging display screen comprises one of (i) a LCD display screen, (ii) a plasma display screen, (iii) a LED array display screen and (iv) an OLED display screen;
a head tracking system that determines an eye position of at least one eye of the occupant to provide eye position information to said display, and wherein said display is operable to display images responsive to said head tracking system;
an image processor;
wherein said image processor generates a virtual image for display by said imaging display screen, and wherein the generated virtual image is derived from image data captured by said camera;
wherein the displayed virtual image is projected through said micro lens array so as to be viewable by the occupant of the equipped vehicle; and
wherein the displayed virtual image is at a virtual display location relative to a current eye position of the occupant by, with the driver viewing said light field display, tracing of virtual lines between each of a plurality of virtual image pixels at the virtual display location to a determined current eye position of the occupant and determining where each virtual line crosses the micro lens array and determining particular display pixels of said imaging display screen that correspond with respective virtual image pixels; and
wherein said system calculates look-up tables on the basis of display pixel center positions, a micro lens focal length and positions of nodes of an eye box for use in image processing by said image processor.

2. The vision system of claim 1, wherein said head tracking system comprises a camera and an image processor operable to process image data captured by said camera to determine an eye location of the occupant's eyes, and wherein said display comprises an adjustable mirror element disposed along an optical path between a display screen of said display and the occupant's head region, and wherein said adjustable mirror element is adjusted to adjust the optical path to accommodate different determined locations of the occupant's eyes.

3. The vision system of claim 1, wherein said light field display is disposed at a location for an interior rearview mirror assembly of the equipped vehicle, and wherein one of (i) said light field display replaces the interior rearview mirror of the equipped vehicle, (ii) said light field display is located at the side, above or below the interior rearview mirror of the equipped vehicle, and (iii) said light field display is located behind a reflective element of the interior rearview mirror assembly, and wherein the reflective element is at least partially transmissive of light such that said light field display, when operated, is viewable through the reflective element.

4. The vision system of claim 1, wherein one of (i) said light field display is located in an instrument panel of the equipped vehicle, (ii) said light field display comprises light field monitors located at or near the left A column of the equipped vehicle and the right A column of the equipped vehicle and wherein said light field monitors function as a side rearview mirror replacement system, (iii) said vision system comprises a navigation system having said light field display disposed at or in an instrument panel of the equipped vehicle, (iv) said vision system comprises an infotainment system having said light field display disposed at or in the instrument panel of the equipped vehicle, and (v) said vision system comprises an infotainment system having said light field display disposed at or in the back of a front seat head rest of the equipped vehicle.

5. The vision system of claim 1, wherein said vision system comprises a head-up display system having said light field display disposed at or in the instrumental panel and projecting images onto one of (i) the windshield of the equipped vehicle and (ii) a combiner on top of a dashboard of the equipped vehicle and facing the driver of the equipped vehicle.

6. The vision system of claim 1, wherein said image processor creates a virtual image viewable by the occupant with a virtual distance of 1.5 m or more from the occupant's eye region.

7. The vision system of claim 1, wherein said micro lens array has an orientation of micro lenses to said display at an angle of between about 30 degrees and about 60 degrees.

8. The vision system of claim 1, wherein image processing is refined by using continuously measured eye positions.

9. The vision system of claim 1, wherein said display comprises an LED array which is moved in x- and y-directions with respect to a micro lens plate thereby increasing the resolution.

10. The vision system of claim 1, wherein said display comprises a fixed LED array which has its light beam redirected by a movable reflective element in two orthogonal angular directions thereby increasing the resolution.

11. The vision system of claim 1, wherein said display comprises a LED array where only a portion of LEDs are switched on simultaneously, and wherein the portion of LEDs that are switched on simultaneously is less than the entirety of the LEDs of said LED array.

12. The vision system of claim 1, wherein said light field display is operable to project three dimensional images for viewing by the occupant of the equipped vehicle.

13. An instrument display for a vehicle, said instrument display comprising:
    a display disposed at a dashboard of a vehicle equipped with said instrument display and operable to display vehicle status information for viewing by a driver of the vehicle;
    wherein said display comprises a light field display;
    a control operable to adjust said light field display to improve the visibility of the displayed information by adjusting a local image pattern to the need of the driver's eyes and responsive to the color dispersion of the human eye and allowing 3D impressions;
    wherein, responsive to changes in vehicle status information, the local image pattern is adjusted by displaying some vehicle status information in the foreground and other vehicle status information in the background;
    wherein color of the displayed vehicle status information is adjusted responsive to at least one of ambient light at the equipped vehicle, a headlamp status of the equipped vehicle, age of the driver and/or an output of a driver drowsiness monitoring system; and
    wherein said system calculates look-up tables on the basis of display pixel center positions, a micro lens focal length and positions of nodes of an eye box for use in image processing by an image processor.

14. A vision system of a vehicle, said vision system comprising:
    a display configured to be disposed in a vehicle equipped with said vision system so as to be operable to display images for viewing by an occupant of the equipped vehicle;
    wherein said display comprises a light field display comprising a display screen and a micro lens array, and wherein said display screen generates displayed images that project through said micro lens array so as to display images viewable and discernible by the occupant of the equipped vehicle at a region forward of the occupant and above a dashboard of the equipped vehicle;
    a head tracking system operable to determine a location of the occupant's eyes and to provide eye location information to said light field display;
    wherein said light field display is operable to display images responsive to said head tracking system; and
    wherein said light field display comprises an adjustable first mirror element disposed along an optical path between said display screen and the determined eye location, and wherein said adjustable first mirror element is adjustable to adjust the optical path to adapt the displayed images for different determined eye locations of the occupant's eyes; and
    wherein said system calculates look-up tables on the basis of display pixel center positions, a micro lens focal length and positions of nodes of an eye box for use in image processing by an image processor.

15. The vision system of claim 14, comprising at least one camera configured to be disposed at a vehicle so as to have a respective field of view exterior of the vehicle, and wherein said display is operable to display images derived from image data captured by said at least one camera.

16. The vision system of claim 14, wherein said light field display is operable to project three dimensional images for viewing by the occupant of the equipped vehicle.

* * * * *